(12) United States Patent
Watanabe

(10) Patent No.: US 10,377,330 B2
(45) Date of Patent: Aug. 13, 2019

(54) LATERAL ROLLOVER RISK WARNING DEVICE

(71) Applicant: National University Corporation Tokyo University of Marine Science and Technology, Tokyo (JP)

(72) Inventor: Yutaka Watanabe, Tokyo (JP)

(73) Assignee: National University Corporation Tokyo University of Marine Science and Technology, Tokyo (JP)

(*) Notice: Subject to any disclaimer, the term of this patent is extended or adjusted under 35 U.S.C. 154(b) by 217 days.

(21) Appl. No.: 15/123,671

(22) PCT Filed: Feb. 25, 2015

(86) PCT No.: PCT/JP2015/055310
§ 371 (c)(1),
(2) Date: Sep. 5, 2016

(87) PCT Pub. No.: WO2015/133339
PCT Pub. Date: Sep. 11, 2015

(65) Prior Publication Data
US 2017/0015265 A1    Jan. 19, 2017

(30) Foreign Application Priority Data

Mar. 5, 2014 (JP) .................................. 2014-042314

(51) Int. Cl.
*B60R 21/0132* (2006.01)
*B63B 43/00* (2006.01)
(Continued)

(52) U.S. Cl.
CPC ...... *B60R 21/0132* (2013.01); *B60R 16/0233* (2013.01); *B60W 40/13* (2013.01);
(Continued)

(58) Field of Classification Search
None
See application file for complete search history.

(56) References Cited

U.S. PATENT DOCUMENTS 5,189,920 A * 3/1993 Martinez ............... G01M 1/122
73/865.3
5,825,284 A * 10/1998 Dunwoody ........ B60G 17/0162
340/440
(Continued)

FOREIGN PATENT DOCUMENTS

EP          0942839 B1    10/2001
JP       2002-274214 A     9/2002
(Continued)

*Primary Examiner* — Steven Lim
*Assistant Examiner* — Muhammad Adnan
(74) *Attorney, Agent, or Firm* — Hawaii Patent Services; Nathaniel K. Fedde

(57) ABSTRACT

A lateral rollover risk warning device can report vehicle rollover risk in real time during traveling with no need for inputting radius of a curved path in advance.
It includes a first acceleration sensor detecting an external force applied in up-down direction of a vehicle body; an angular velocity sensor detecting a rotation around vehicle axis of vehicle body; and a second acceleration sensor detecting an external force in right-left direction of vehicle body, with an arithmetic part using detection results given by first acceleration sensor and angular velocity sensor to calculate a limit index of vehicle being led to a rollover, and using detection result given by second acceleration sensor to calculate a comparative index to be compared with limit index in real time; and a reporting part using limit index and comparative index to report lateral rollover risk warning information telling the rollover risk.

5 Claims, 18 Drawing Sheets

(51) Int. Cl.
  *B60R 16/023* (2006.01)
  *G01M 1/12* (2006.01)
  *B60W 40/13* (2012.01)
  *B63B 39/14* (2006.01)

(52) U.S. Cl.
  CPC ............ *B63B 43/00* (2013.01); *G01M 1/122* (2013.01); *B60W 2040/1315* (2013.01); *B60W 2300/14* (2013.01); *B63B 39/14* (2013.01)

(56) References Cited

U.S. PATENT DOCUMENTS

| | | | |
|---|---|---|---|
| 6,002,974 A * | 12/1999 | Schiffmann | B60R 21/01 |
| | | | 180/252 |
| 6,170,594 B1 * | 1/2001 | Gilbert | B60R 16/0233 |
| | | | 180/282 |
| 6,185,489 B1 * | 2/2001 | Strickler | B60G 17/0162 |
| | | | 701/31.9 |
| 6,421,592 B1 * | 7/2002 | Bargman | B60R 21/013 |
| | | | 180/271 |
| 6,529,811 B2 * | 3/2003 | Watson | B60R 21/013 |
| | | | 701/1 |
| 6,542,073 B2 * | 4/2003 | Yeh | B60R 21/013 |
| | | | 340/438 |
| 6,556,908 B1 * | 4/2003 | Lu | B60G 17/0185 |
| | | | 180/271 |
| 6,611,784 B2 * | 8/2003 | Tobaru | B60R 16/0234 |
| | | | 701/1 |
| 7,522,982 B2 * | 4/2009 | Le | B60R 21/0132 |
| | | | 180/271 |
| 7,698,036 B2 * | 4/2010 | Watson | B60R 21/0132 |
| | | | 280/5.506 |
| 7,826,948 B2 * | 11/2010 | Messih | B60G 17/016 |
| | | | 180/282 |
| 8,275,516 B2 * | 9/2012 | Murphy | A01B 69/00 |
| | | | 701/124 |
| 8,498,773 B2 * | 7/2013 | Marur | B60G 17/021 |
| | | | 280/5.508 |
| 9,046,438 B2 * | 6/2015 | Watanabe | G01M 1/122 |
| 2003/0050741 A1 | 3/2003 | Bauer et al. | |
| 2005/0017578 A1 * | 1/2005 | Kato | B60T 8/17554 |
| | | | 303/146 |
| 2005/0060069 A1 * | 3/2005 | Breed | B60N 2/2863 |
| | | | 701/408 |
| 2006/0030991 A1 * | 2/2006 | Barta | B60G 17/0182 |
| | | | 701/70 |
| 2006/0138754 A1 | 6/2006 | Hirata et al. | |
| 2006/0161323 A1 * | 7/2006 | Sawahata | B60R 21/0132 |
| | | | 701/45 |
| 2007/0017727 A1 * | 1/2007 | Messih | B60G 17/016 |
| | | | 180/282 |
| 2008/0208416 A1 * | 8/2008 | Yuet | B60T 7/12 |
| | | | 701/50 |
| 2010/0182432 A1 * | 7/2010 | Augst | B60R 1/00 |
| | | | 348/148 |
| 2010/0198492 A1 * | 8/2010 | Watanabe | B60W 40/12 |
| | | | 701/124 |
| 2013/0132025 A1 | 5/2013 | Watanabe | |
| 2014/0257633 A1 * | 9/2014 | Alexander | B60R 16/0233 |
| | | | 701/36 |
| 2015/0246654 A1 * | 9/2015 | Tadic | B60W 40/09 |
| | | | 340/436 |
| 2015/0283944 A1 * | 10/2015 | Alexander | B60Q 9/00 |
| | | | 340/438 |

FOREIGN PATENT DOCUMENTS

| | | |
|---|---|---|
| JP | 2007-055392 A | 3/2007 |
| JP | 2010-120444 A | 6/2010 |
| WO | WO2008062867 A | 5/2008 |
| WO | WO2011145332 A | 11/2011 |

\* cited by examiner

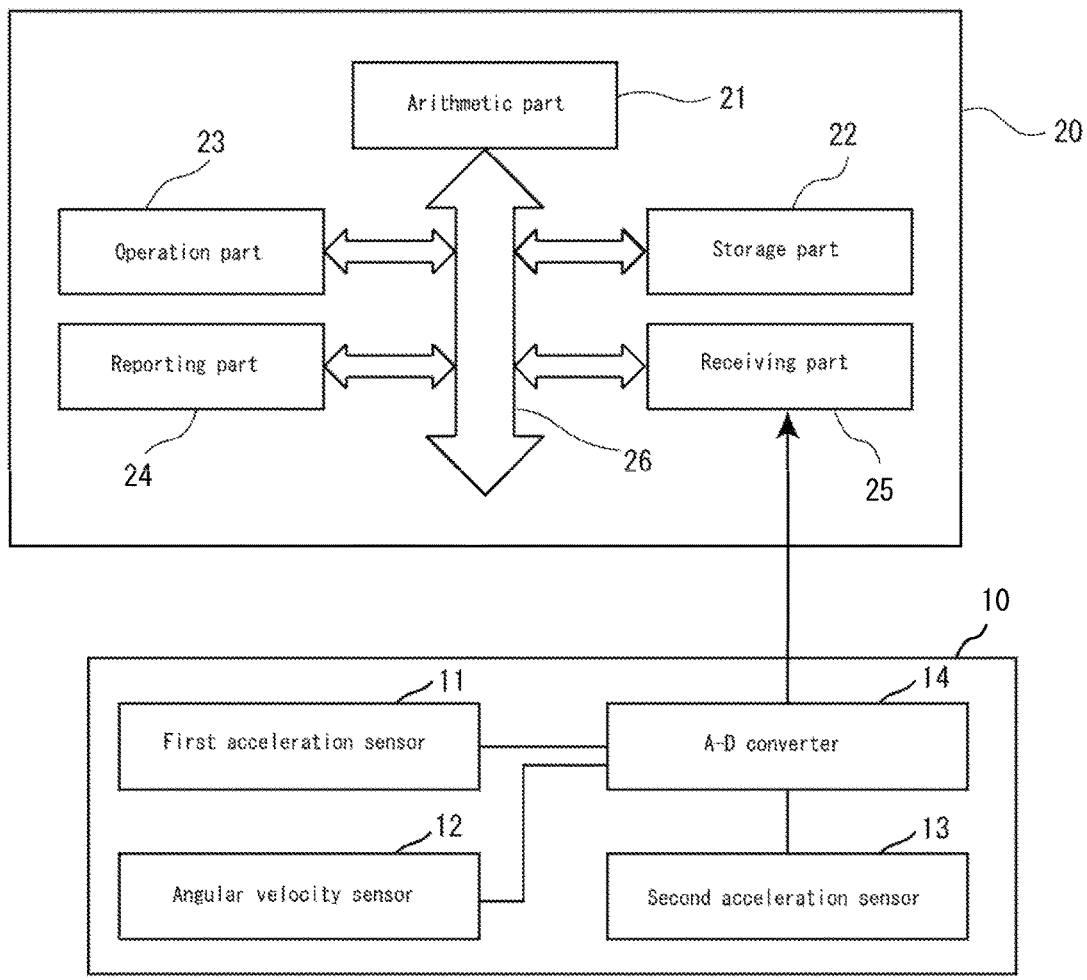

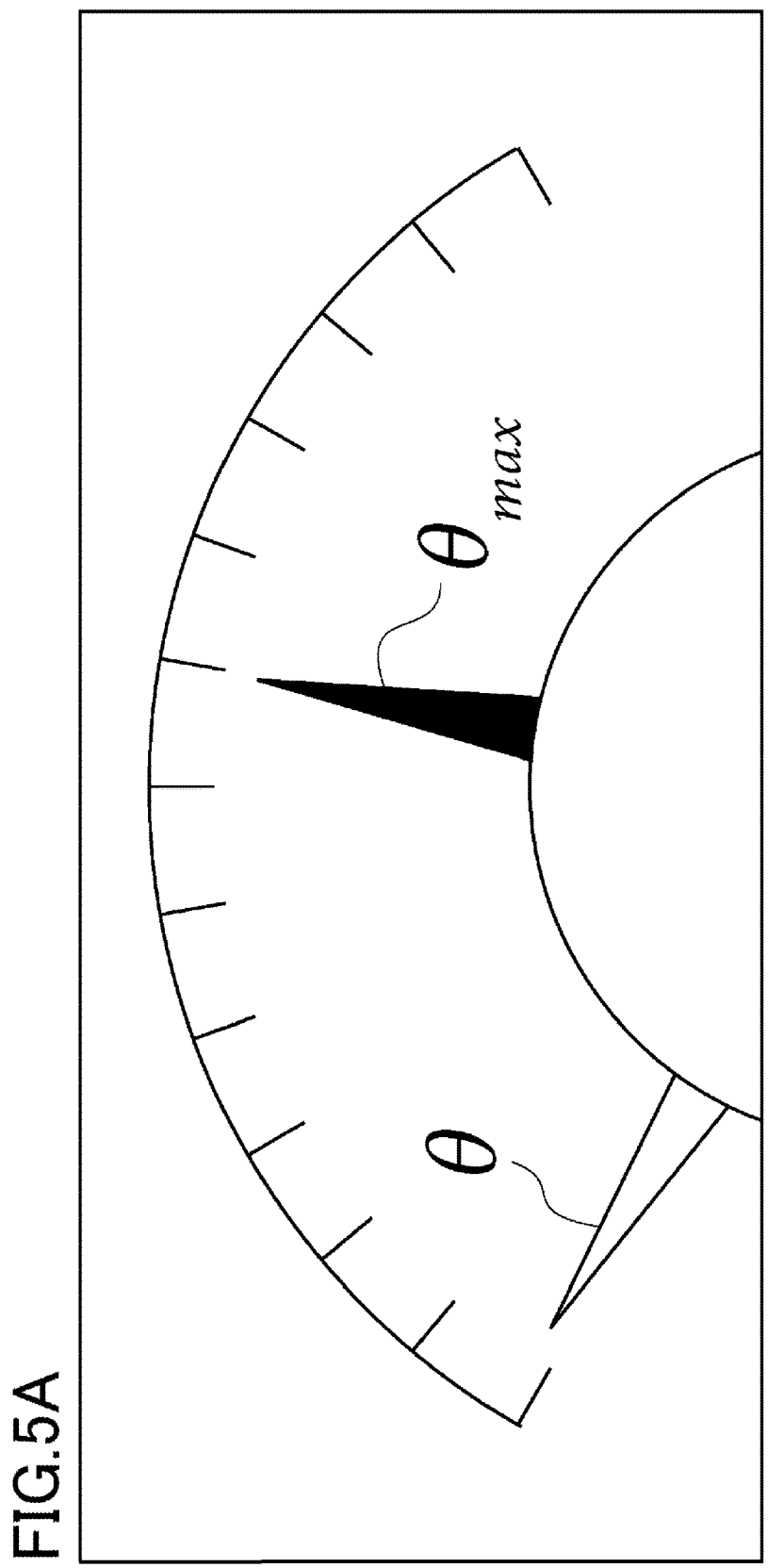

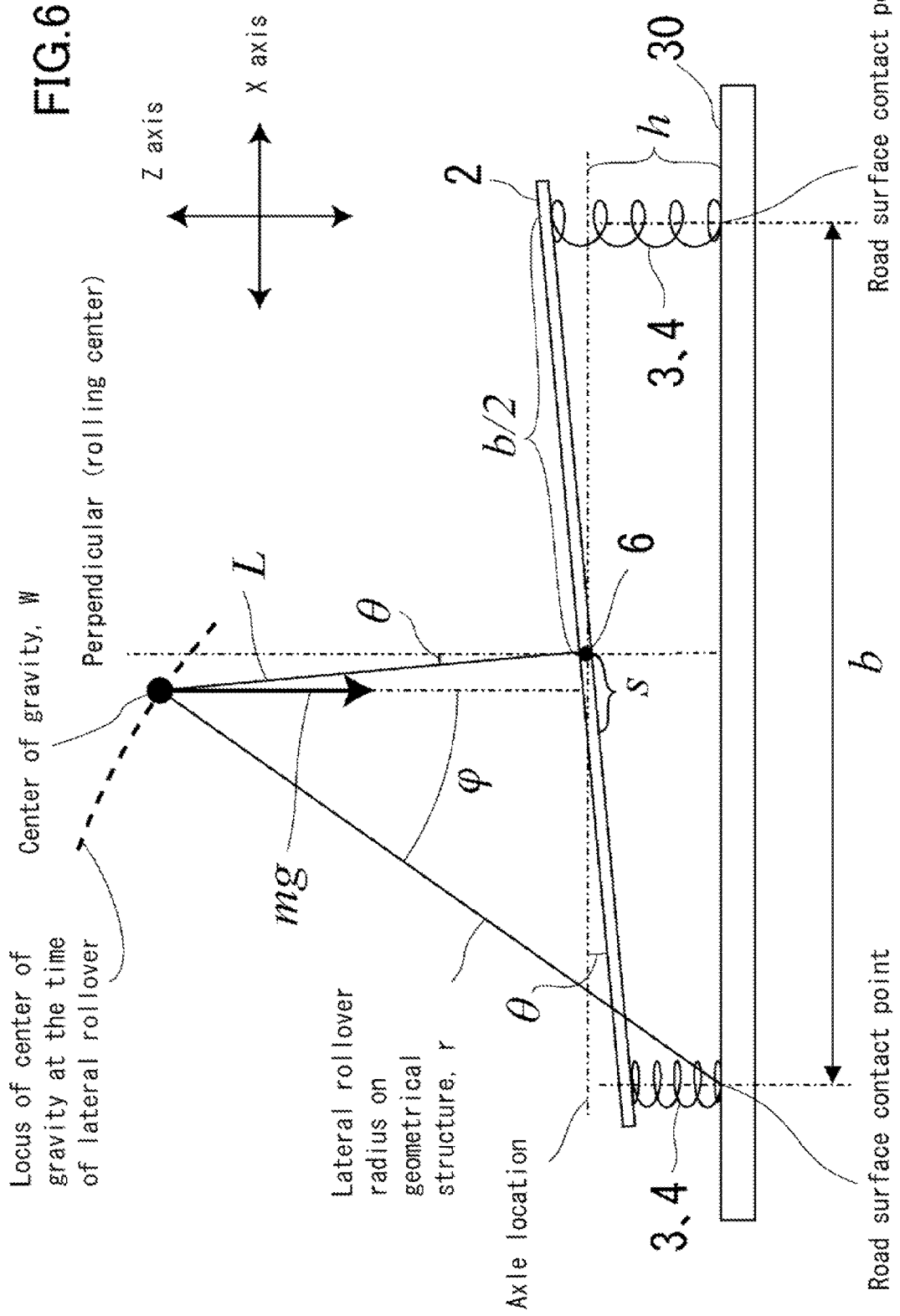

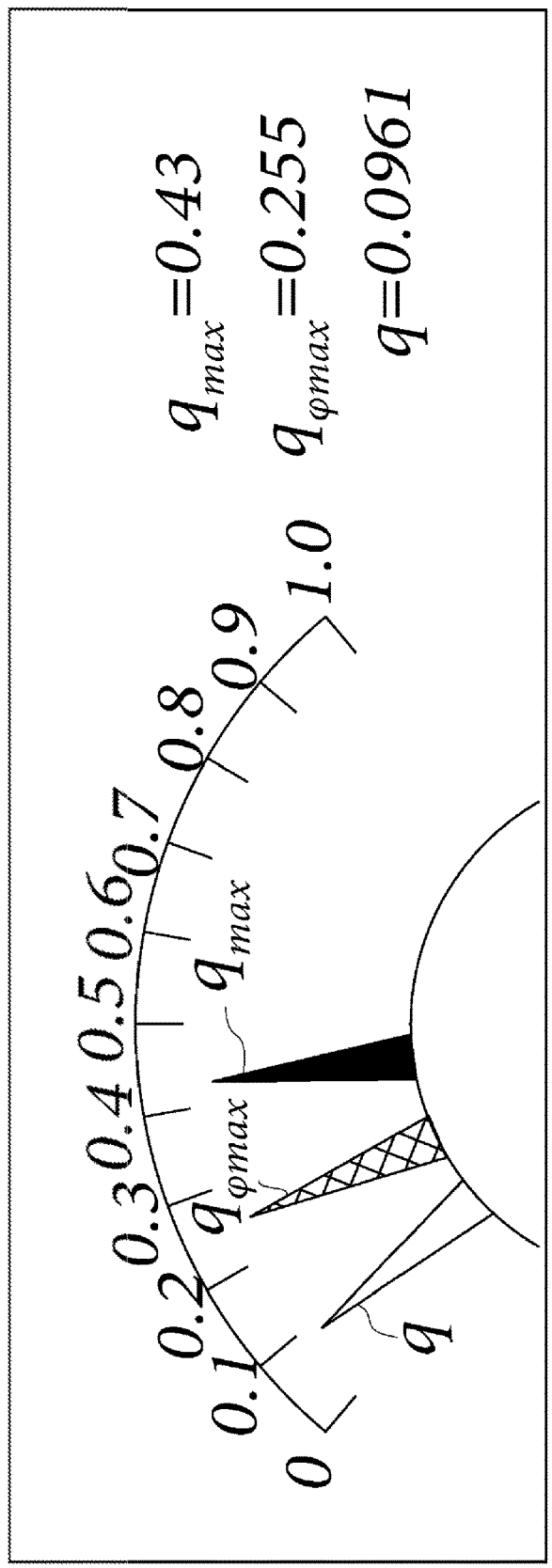

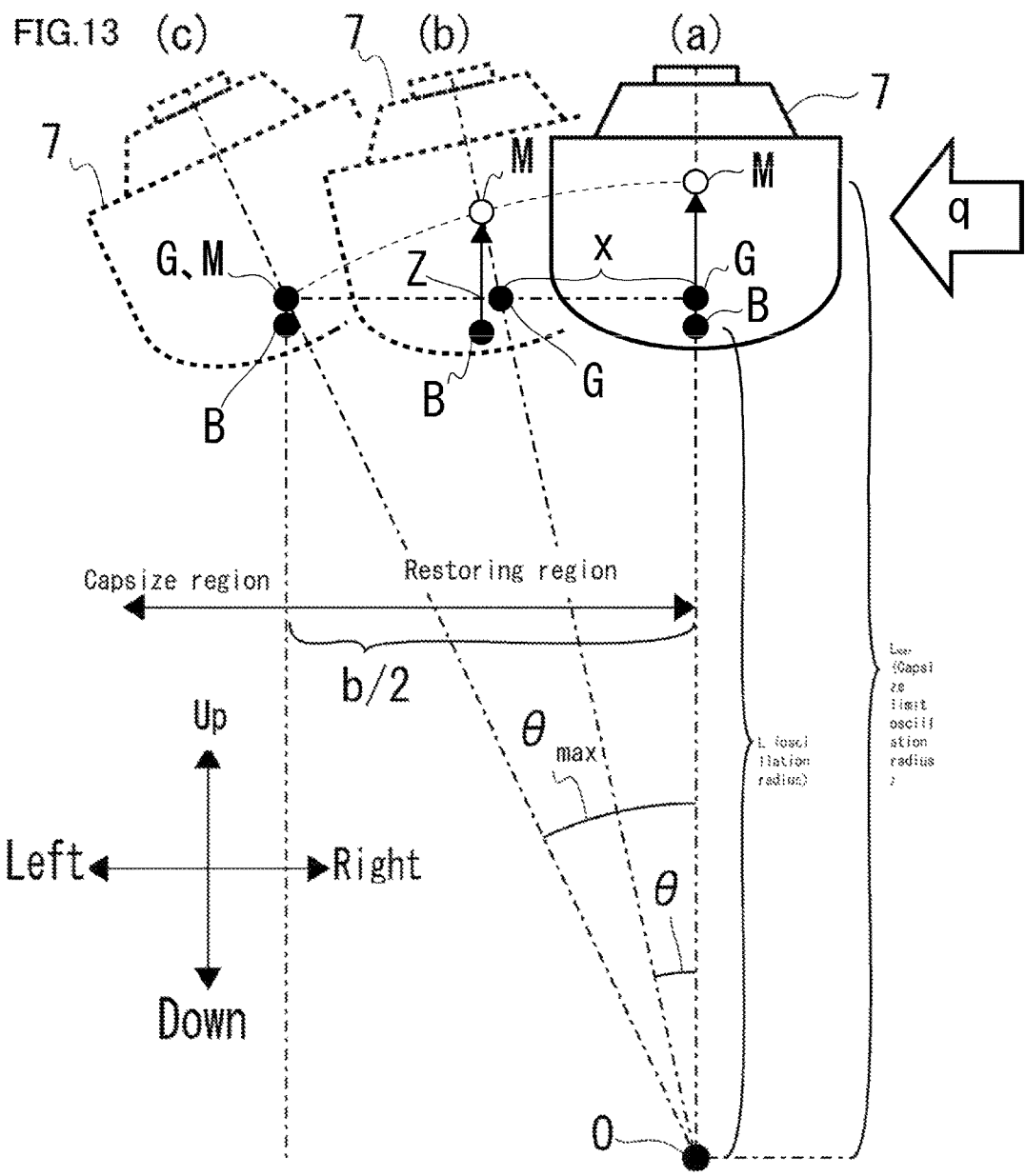

LATERAL ROLLOVER RISK WARNING DEVICE

TECHNICAL FIELD

The present invention relates to a lateral rollover risk warning device that reports the risk that a vehicle may be rolled over laterally.

BACKGROUND ART

With the Patent Document 1, the present inventor has proposed a technique that uses the 3-D center-of-gravity detection theory to calculate a limit center-of-gravity height beyond which a structure will be rolled over laterally, as the lateral rollover limit height, thereby determining the lateral rollover risk of a structure for which the weight or the weight distribution has not been clarified in advance, on the basis of the lateral rollover limit height that has been calculated.

CITATION LIST

Patent Literature

Patent Document 1: WO2008062867

DISCLOSURE OF THE INVENTION

Problems to be Solved by the Invention

The biggest problem that has been presented in putting the technology of the Patent Document 1 into service that utilizes the 3-D center-of-gravity detection theory for preventing a lateral rollover of a vehicle, such as various types of trains, various types of trucks, various types of buses, and various types of passenger vehicles, which are mobile bodies, is that the radius of a curved path of a road or a railway must be known in advance. For utilizing not only the lateral rollover limit speed expression in the Patent Document 1, but also any conventional lateral rollover limit speed expression, it is indispensable to input the radius of the curved path in advance. Particularly, in case of a general automobile traveling, it is difficult for the driver to know the radius of a curved path on which he or she is traveling, and in addition, since his or her handling of the wheel at the time of right or left turn at an intersection or at the time of a lane change is at his or her discretion, what curved path traveling would be made and the radius of the curved path that would be followed are far beyond the prediction ability of any technology.

In view of the above problem, the present invention has been made in order to solve the problem of the prior art, and it is an object of the present invention to provide a lateral rollover risk warning device that can report the risk of a vehicle rolling over laterally in real time during traveling with no need for inputting the radius of a curved path in advance.

Means for Solving the Problems

The lateral rollover risk warning device of the present invention is a lateral rollover risk warning device that is installed in a vehicle that is supported by spring structures on both sides in the right-left direction across a vehicle axis of a vehicle body, respectively, reporting the risk of the vehicle being rolled over, the lateral rollover risk warning device including: a vertical direction physical amount detection means for detecting an external force applied in the vertical direction of the vehicle body; a rotational direction physical amount detection means for detecting a rotation around the vehicle axis of the vehicle body; a limit index calculating means that uses the results of detection by the vertical direction physical amount detection means and the rotational direction physical amount detection means to calculate an index of the limit at which the vehicle is led to be rolled over; a right-left direction physical amount detection means for detecting an external force applied in the right-left direction of the vehicle body; a real-time index calculating means that uses the result of detection by the right-left direction physical amount detection means to calculate a comparative index to be compared with the limit index in real time; and a reporting means that uses the limit index and the comparative index to report a piece of lateral rollover risk warning information telling the risk of rolling over.

Further, in the lateral rollover risk warning device of the present invention, the limit index calculating means may calculate a restoring force losing lateral rollover limit external force, which indicates an external force that exceeds the restoring force of the spring structures, being applied to the vehicle, as the limit index.

Further, in the lateral rollover risk warning device of the present invention, the limit index calculating means may calculate a restoring force losing lateral rollover limit angle, which indicates the angle of the vehicle body at a time when an external force exceeding the restoring force of the spring structures acts in the right-left direction, and thus the vehicle is led to a rollover in the right-left direction, as the limit index.

Further, in the lateral rollover risk warning device of the present invention, the limit index calculating means may calculate a lateral rollover limit external force on the geometrical structure, which indicates the external force that leads the vehicle to a rollover on the geometrical structure, being applied in the right-left direction, even if the restoring force by the spring structures is sufficient, as the limit index.

In addition, the lateral rollover risk warning device of the present invention is a lateral rollover risk warning device that is installed in a vehicle that is supported by spring structures on both sides in the right-left direction across a vehicle axis of a vehicle body, respectively, reporting the risk of the vehicle being rolled over, the lateral rollover risk warning device including: a vertical direction physical amount detection means for detecting an external force applied in the vertical direction of the vehicle body; a rotational direction physical amount detection means for detecting a rotation around the vehicle axis of the vehicle body; a limit condition calculating means that uses the results of detection by the vertical direction physical amount detection means and the rotational direction physical amount detection means to calculate a combination of the traveling speed and the horizontal direction deflection angle with which the vehicle is led to a rollover, as a limit condition; a traveling information receiving means that receives either or both of the traveling speed and the horizontal direction deflection angle from the vehicle in real time as a piece of traveling information; and a reporting means that uses the limit condition and the piece of traveling information to report a piece of lateral rollover risk warning information telling the risk of rolling over.

In addition, the lateral rollover risk warning device of the present invention is a lateral rollover risk warning device that is installed in a vessel that is supported by a floating force on both sides in the right-left direction across the centerline, respectively, reporting the risk of the vessel being rolled over, the lateral rollover risk warning device including: a vertical direction physical amount detection means for detecting an external force applied in the vertical direction of the vessel; a rotational direction physical amount detection means for detecting a rotation around the centerline of the vessel; a limit index calculating means that uses the results of detection by the vertical direction physical amount detection means and the rotational direction physical amount detection means to calculate an index of the limit at which the vessel is led to be rolled over; a right-left direction physical amount detection means for detecting an external force applied in the right-left direction of the vessel; a real-time index calculating means that uses the result of detection by the right-left direction physical amount detection means to calculate a comparative index to be compared with the limit index in real time; and a reporting means that uses the limit index and the comparative index to report a piece of lateral rollover risk warning information telling the risk of rolling over.

Advantages of the Invention

In accordance with the present invention, there is provided an advantage that it is capable of reporting the risk of a vehicle rolling over laterally in real time on the basis of the result of detection by a detection means installed on a vehicle with no need for inputting the radius of a curved path in advance.

BRIEF DESCRIPTION OF THE DRAWINGS

FIG. 3 is a block diagram illustrating a configuration of a lateral rollover risk warning device according to the first embodiment of the present invention;

FIG. 6 is an explanatory drawing for explaining the limit of lateral rollover on the geometrical structure;

FIG. 13 is a drawing illustrating the relationship among the metacenter M, the center of gravity G, the center of buoyancy, the oscillation center axis O, and the GZ in the case where a vessel as a floating body structure that is loaded with a lateral rollover risk warning device according to the fourth embodiment of the present invention is brought to a greatly inclined state.

BEST MODE FOR CARRYING OUT THE INVENTION

Next, embodiments of the present invention will be specifically explained with reference to the drawings.

First Embodiment

Figure 1:
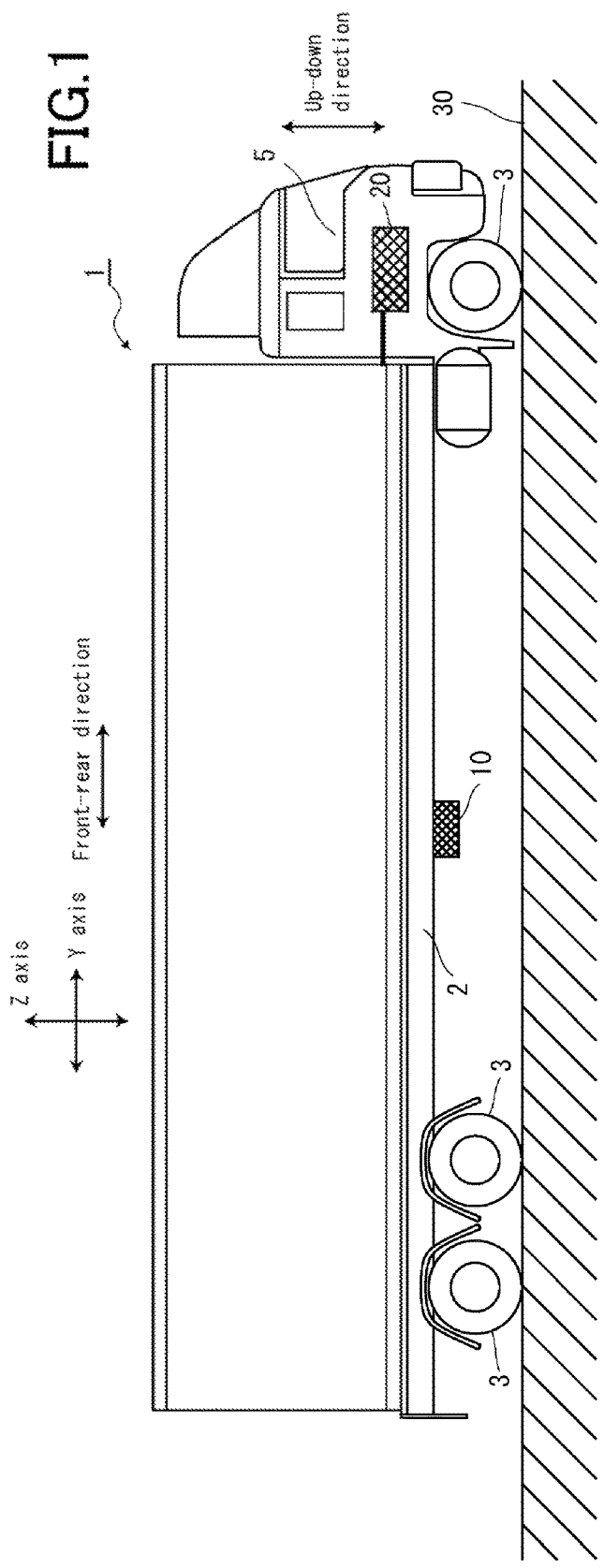
FIG. 1 is a side view illustrating a configuration of a vehicle on which a lateral rollover risk warning device according to a first embodiment of the present invention is installed.

With reference to FIG. 1, a lateral rollover risk warning device according to a first embodiment is loaded on a vehicle 1, such as various types of trains, various types of trucks, various types of buses, and various types of passenger vehicles, which are mobile bodies, and includes an external force detector 10 that detects an external force applied to the vehicle 1, and a data processing apparatus 20 that, on the basis of the external force that has been detected by the external force detector 10, generates a piece of lateral rollover risk warning information telling the risk of lateral rollover.

Figure 2:
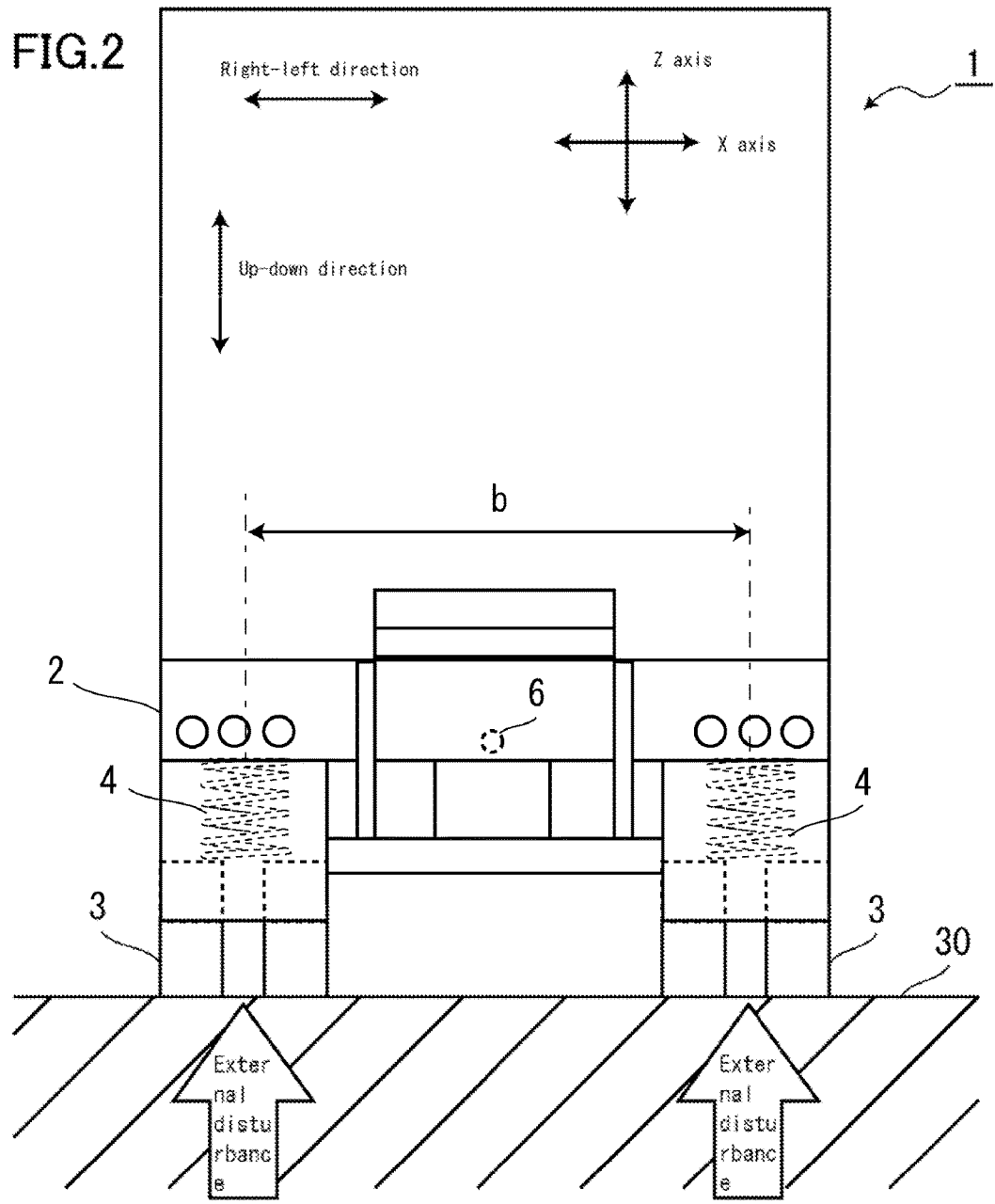
FIG. 2 is a rear view illustrating a configuration of a vehicle on which a lateral rollover risk warning device according to the first embodiment of the present invention is installed.

With reference to FIG. 1 and FIG. 2, the vehicle 1 is a truck including a cargo bed 2 on which a cargo is loaded, and is erected at a certain level from the road surface 30, the mass (including the load of the cargo) of the vehicle 1 being supported by a cushioning elastic force comprised of tires 3 and suspensions 4. Then, when the vehicle 1 is traveled, the tires 3 continue to tread on the irregularities of the road surface 30, thereby a random external disturbance being transmitted to the cargo bed 2 of the vehicle 1 through the tires 3 and the suspensions 4. As shown in FIG. 1 and FIG. 2, the direction perpendicular to the placing surface of the cargo bed 2 is defined as an up-down direction; the direction along the longitudinal width of the vehicle 1 as a front-rear direction; and the direction along the crosswise width of the vehicle 1 as a right-left direction. In addition, the self-weight direction in which the gravity acts is defined as a Z-axis direction; the direction which is orthogonal to the Z-axis direction and the front-rear direction, respectively, as an X-axis direction; and the direction which is orthogonal to the Z-axis direction and the right-left direction, respectively, as a Y-axis direction. In the state in which the cargo bed 2 is level, the up-down direction coincides with the Z-axis direction; the front-rear direction with the Y-axis direction; and the right-left direction with the X-axis direction, respectively.

The right and left cushioning elastic forces each comprised of tires 3 and suspensions 4 are disposed in a linear symmetry with respect to a vehicle axis 6 that is located at the center in the right-left direction of the cargo bed 2 and extends in the front-rear direction thereof. Therefore, the cargo bed 2 is supported by approximately the same elastic force on both sides across the vehicle axis 6, and when an external disturbance is transmitted to the cargo bed 2 of the vehicle 1 through the tires 3 and suspensions 4, there is brought about a state in which a horizontal oscillation in the direction of rotation around the vehicle axis 6 as the oscillation central axis, and a vertical oscillation in the up-down direction can be made.

The external force detector 10 is installed at the center in the right-left direction of the cargo bed 2, and the data processing apparatus 20 is installed in a driver's seat 5. The installation location of the external force detector 10 is not limited to the cargo bed 2, provided that the external force detector 10 is installed in the vehicle body of the vehicle 1 that is supported by the elastic forces. In addition, for a trailer truck that is configured such that a container chassis and a tractor can be disconnected, the external force detector 10 may be disposed in the tractor. Further, the external force detector 10 may be installed in a location that is away from the center to a certain degree, being displaced forward or backward, or rightward or leftward, within a range in which there occurs no problem of a wrong detection for motions affected by another axis.

With reference to FIG. 3, the external force detector 10 includes a first acceleration sensor 11, an angular velocity sensor 12, a second acceleration sensor 13, and an A-D converter 14. With the first acceleration sensor 11, the sensitivity axis is adjusted such that the acceleration in the up-down (self-weight) direction (the Z-axis direction shown in FIG. 1 and FIG. 2), in other words, the vertical oscillation of the cargo bed 2 in the up-down direction is detected. With the angular velocity sensor 12, the sensitivity axis is adjusted such that the angular velocity in a direction of rotation around the vehicle axis 6. Hereinafter, the direction of rotation around the vehicle axis 6 is referred to as the rolling direction. With the second acceleration sensor 13, the sensitivity axis is adjusted such that the acceleration in the right and left direction (the X-axis direction shown in FIG. 2), in other words, the external force in the right-left direction that is applied to the cargo bed 2 is detected.

In addition, the first acceleration sensor 11, the angular velocity sensor 12, and the second acceleration sensor 13 are not particularly limited, and, for example, a crystal tuning fork type sensor or an oscillation type sensor may be used, and as the first acceleration sensor 11, the angular velocity sensor 12, and the second acceleration sensor 13, a three-axis (three dimensional) acceleration/angular velocity sensor may also be used. The A-D converter 14 converts analog signals (detection results) outputted from the first acceleration sensor 11, the angular velocity sensor 12, and the second acceleration sensor 13 into digital signals to output them to the data processing apparatus 20. Further, instead of the second acceleration sensor 13, an angular velocity sensor that detects a yaw angular velocity is installed horizontally, and with the detection result obtained, a trigonometric function may be used to determine the acceleration in the right-left direction.

The data processing apparatus 20 is an information processing apparatus, such as a personal computer, and generates a piece of lateral rollover risk warning information on the basis of the result of detection that has been performed by the external force detector 10.

Referring to FIG. 3, the data processing apparatus 20, which is an information processing apparatus, includes an arithmetic part 21 comprised of a microprocessor, and the like; a storage part 22 comprised of an ROM (read-only memory), an RAM (random access memory), and the like; an operation part 23, such as a keyboard; a reporting part 24, such as a liquid crystal display or a speaker; and a reception part 25, the respective parts being connected by a bus 26.

In the storage part 22, a calculation program for generating a piece of lateral rollover risk warning information, and various constants to be inputted that are required for the calculation in question are stored. The arithmetic part 21 stores the outputs from the external force detector 10 in the storage part 22 for a certain period of time; generates a piece of lateral rollover risk warning information in accordance with the calculation program stored in the storage part 2; and outputs the piece of lateral rollover risk warning information from the reporting part 24.

Next, the method of generating a piece of lateral rollover risk warning information will be explained in detail.

Figure 4A:
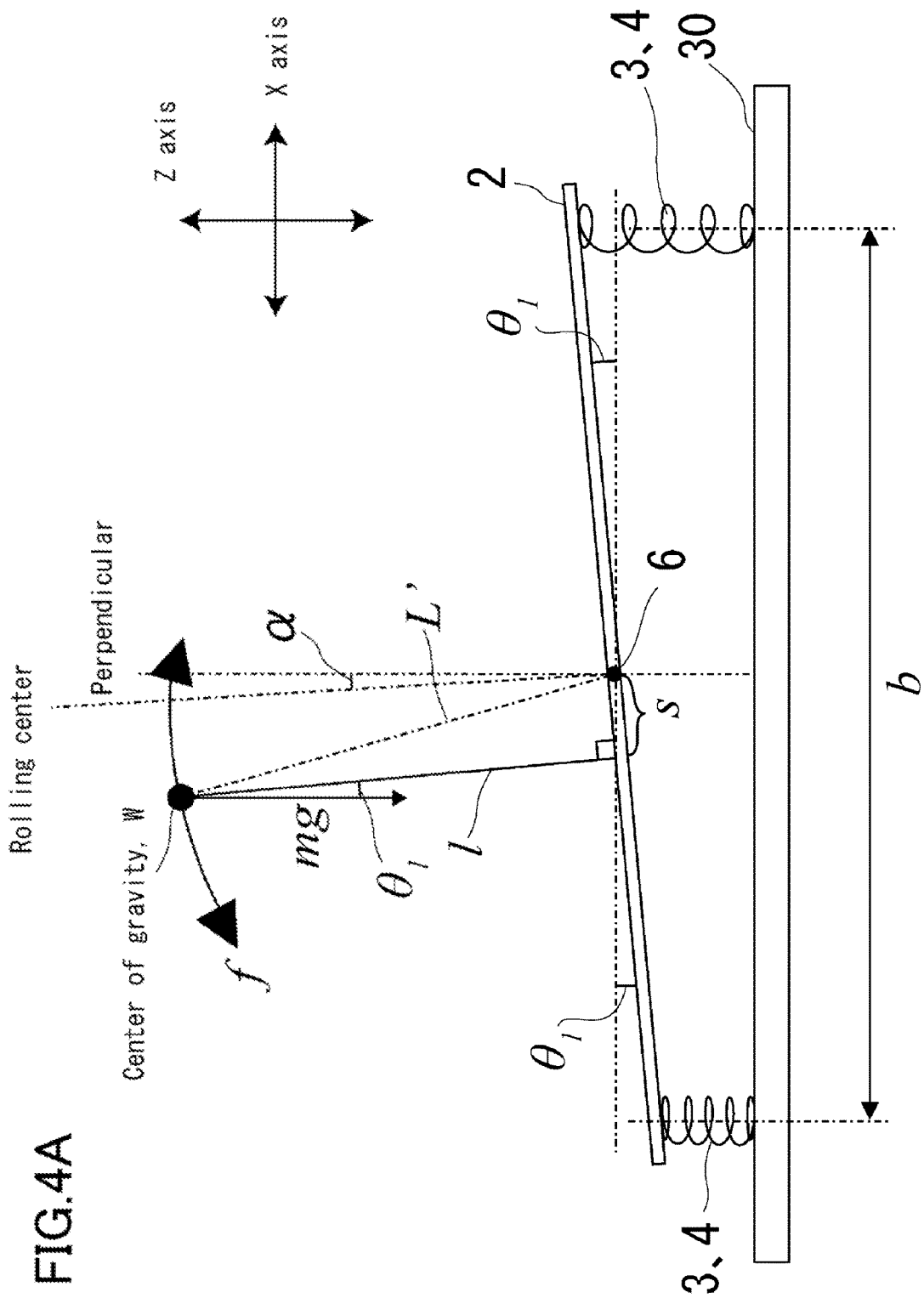
FIG. 4 is an explanatory drawing for explaining the limit of lateral rollover due to the loss of a restoring force.

When the vehicle 1 is traveled, the vehicle body of the vehicle 1 will make an oscillation (characteristic vibration) as shown in FIG. 4A on the basis of a motion having a natural period (frequency) that is dependent on the cushioning elastic force comprised of the tires 3 and the suspensions 4, the weight of the vehicle body (including the cargo, and the like) that is oscillated, being supported by the cushioning elastic force for the vehicle 1 (the tires 3 and the suspensions 4), and the location of the center of gravity, W. This motion is provided in the state in which the movement in the right-left direction (the X-axis direction) is restricted by the vehicle axis 6. Therefore, the first acceleration sensor 11 accurately detects the reciprocating motion of the center of gravity, W, of the vehicle body in the up-down direction as a vertical oscillation in the up-down direction, while the angular velocity sensor 12 detects the simple pendulum motion of the center of gravity, W, of the vehicle body around the vehicle axis 6 as a horizontal oscillation in the direction of rotation.

The result of detection by the first acceleration sensor 11 (the acceleration in the up-down direction) and the result of detection by the angular velocity sensor 12 (the angular velocity in the rolling direction) are inputted to the data processing apparatus 20, and the detection results are stored in a certain period of time in the storage part 22. Then, the arithmetic part 21 of the data processing apparatus 20 determines the vertical oscillation frequency "v'" for the vertical oscillation in the up-down direction from the result of detection by the first acceleration sensor 11 (the acceleration in the up-down direction), which is stored in the storage part 22, while determining the horizontal oscillation frequency "V" for the horizontal oscillation in the rolling direction from the result of detection by the angular velocity sensor 12 (the angular velocity in the rolling direction), which is stored in the storage part 22. In addition, from the result of detection by the angular velocity sensor 12 (the angular velocity in the rolling direction), the arithmetic part 21 determines the angle between the perpendicular center line passing through the vehicle axis 6 and the rolling center line giving the center of horizontal oscillation as an oscillation central angle "α".

The central angle "α" for the oscillation is an inclination angle "α" in a rolling direction of the vehicle body (the cargo bed 2) with respect to the horizontal plane in a standstill state (hereinafter to be referred to as an inclination angle "α" in a standstill state). Therefore, a sensor for measuring the angle of the vehicle body (the cargo bed 2) in a standstill state, such as an inclination angle sensor, may be mounted to the vehicle body (the cargo bed 2) for measuring the inclination angle "α" in a standstill state. In addition, although labor and time are required, it is possible to use a level, or the like, to make a visual measurement of the inclination angle "α" in a standstill state, and input the measurement from the operation part 23 for setting. Further, a measuring means, such as a gyro, which can measure the angle of the vehicle body (the cargo bed 2) may be provided for measuring the inclination angle "α" in a standstill state, or determining the central angle "α" for the oscillation from the result of measurement. Further, the inclination angle "α" may be determined by the inclination angle calculation device that has been proposed by the present applicant with PCT/JP2010/007060. Furthermore, in the case where the vehicle 1 is anyone of the various types of trains, various types of buses, various types of passenger vehicles, and the like, and the inclination of the vehicle body in the loaded state can be expected to be small, the inclination angle "α" in a standstill state may be changed into a constant, being assumed to be equal to 0.

Next, the arithmetic part 21 calculates, on the basis of the vertical oscillation frequency "v'" that has been determined, a lateral rollover limit height $L_{max}$, which indicates the limit of center-of-gravity height beyond which the vehicle 1 comes to a lateral rollover in a right-left direction, while, on the basis of the vertical oscillation frequency "v'", the horizontal oscillation frequency "V'", and the central angle "α" that have been determined, calculating a center-of-gravity height in the up-down direction, "L", from the vehicle axis 6 to the center of gravity, W, of the vehicle body, on the assumption that the center of gravity, W, of the vehicle body is above the vehicle axis 6. The lateral rollover limit height $L_{max}$ is a height at which the vehicle 1 will be rolled over laterally, if the center of gravity of the vehicle 1 is located at a level higher than the lateral rollover limit height $L_{max}$. In addition, the terms, such as lateral rollover, overturning, and turnover, are considered as synonyms which express the phenomenon that the stability of the center of gravity of a matter cannot be held, the rotational motion being progressed, resulting in the matter inevitably falling or collapsing in the gravitational direction. Hereinbelow, in the present embodiment and the other embodiments, the term "lateral rollover" will be used as a word that is representative of such synonyms.

The lateral rollover limit height $L_{max}$ and the center-of-gravity height "l" can be determined by using the following equations ([Math 01] and [Math 02]), which have been proposed by the present inventor with PCT/JP2012/081322. The relationship among the center-of-gravity height "l", the displacement of the center of gravity, W, in the right-left direction, "s", and the length of a straight line connecting between the vehicle axis 6 as the oscillation central axis and the center of gravity, W, "L'", is expressed by the equation: $L'^2 = l^2 + s^2$.

$$L_{max} = \frac{\pi^2 v'^2 b^2}{g} \qquad [\text{Math 01}]$$

$$(1 + \tan^2\alpha)l^2 + \left(\frac{g}{4\pi^2 V'^2 \cos\alpha} - \frac{2\pi^2 v'^2 b^2}{g}\tan^2\alpha\right)l + \qquad [\text{Math 02}]$$
$$\frac{\pi^4 v'^4 b^4}{g^2}\tan^2\alpha - \frac{b^2 v'^2}{4V'^2 \cos\alpha} = 0$$

In [Math 01], the symbol "π" denotes the circular constant; "g" the gravitational acceleration; and "b" the distance between the elastic forces (the tires 3 and the suspensions 4) on the right and left sides across the vehicle axis 6. In [Math 02], the quadratic coefficient, the linear coefficient, and the constant terms can be defined using the vertical oscillation frequency "v'", the horizontal oscillation frequency "V'", and the central angle "α" that have been determined. Therefore, the arithmetic part 21 calculates a center-of-gravity height "l" by operating [Math 02] with the vertical oscillation frequency "v'", the horizontal oscillation frequency "V'", and the central angle "α".

As indicated in Japanese Patent Application 2013-220098 by the present applicant, there exists a center-of-gravity height in the state in which the center of gravity in the state in which the same restoring force as that in the state in which the center of gravity is displaced rightward or leftward is provided is located at the center in the right-left direction. Thus, the level of risk of lateral rollover will be also the same in the both state.

Figure 4B:
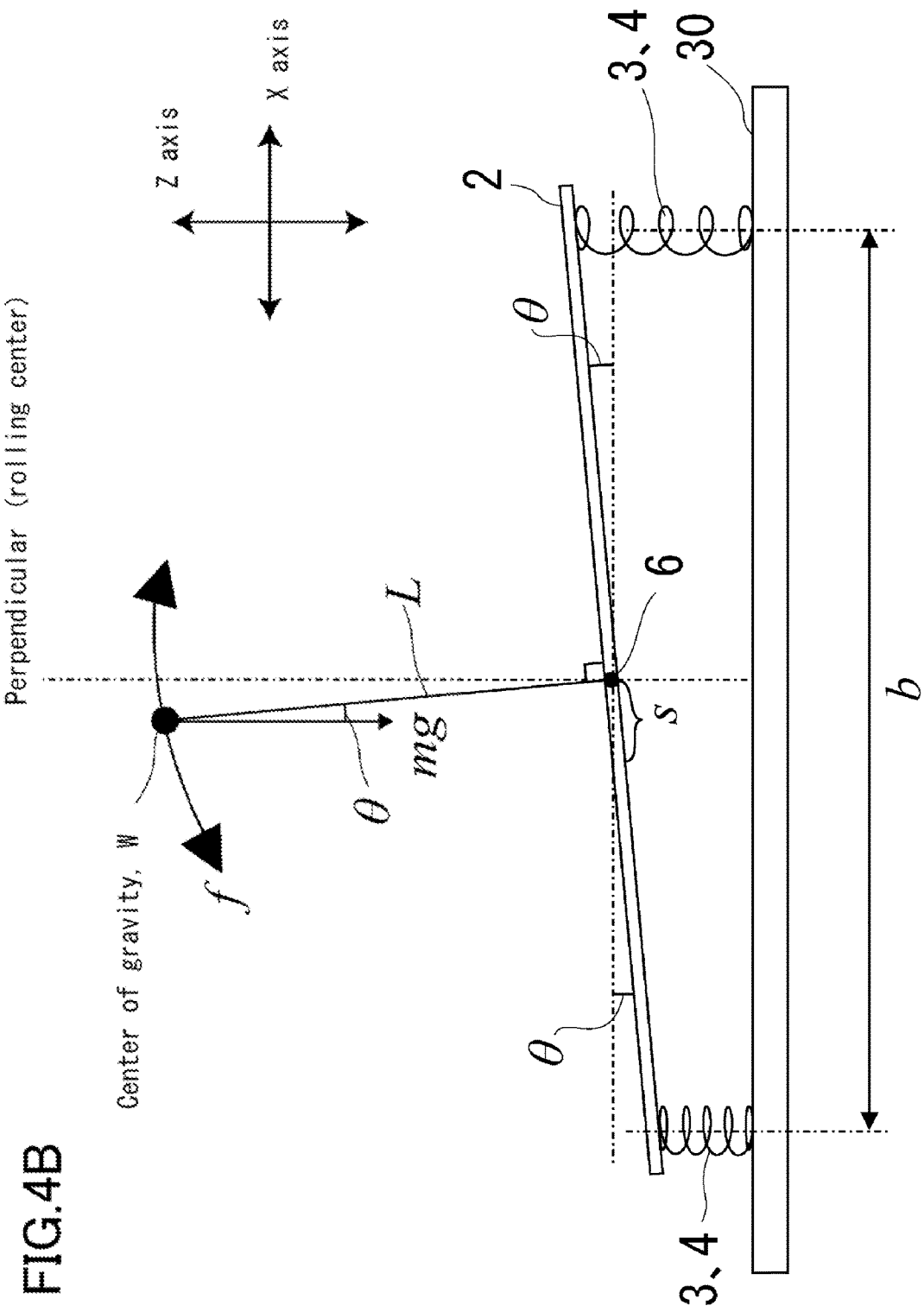

Considering the state as depicted in FIG. 4B in which the center of gravity is not displaced rightward or leftward, i.e., the state in which s=0, although the same restoring force as that in [Math 02] being provided (the values of "v'" and "V'" are the same as those in [Math 02]), and assuming that the center-of-gravity height at that time is "L", [Math 02] can be rewritten as the following equation [Math 03].

$$L^2 + \frac{g}{4\pi^2 V'^2}L - \frac{b^2 v'^2}{4V'^2} = 0 \qquad [\text{Math 03}]$$

Since the restoring force in [Math 03] is the same as that in [Math 02], the lateral rollover limit is also the same. Therefore, once the values of "v'" and "V'" have been obtained, use of [Math 03] will reduce the labor required to derive the lateral rollover limit, and lower the cost of the device. Specifically, the need for determining the inclination angle "α" in a standstill state is eliminated, whereby the variety of schemes as mentioned in the paragraph [0020] can be excluded.

Next, on the basis of the lateral rollover limit height "$L_{max}$" and the center-of-gravity height "L" that have been determined, the arithmetic part 21 calculates an angle of limit in the rolling direction at which the vehicle 1 will lose the restoring force by the right and left elastic forces (the tires 3 and the suspensions 4), leading to a lateral rollover in the right or left direction (hereinafter to be referred to as a restoring force losing lateral rollover limit angle "$\theta_{max}$"), as a limit index. Hereinafter, the method of calculating the restoring force losing lateral rollover limit angle "$\theta_{max}$" will be explained.

In the state in which the vehicle 1 is traveling straight while not rolling over, the location of the lateral rollover limit height "$L_{max}$" is always above that of the center-of-gravity height "L". In other words, in order to cause the mobile body to be rolled over laterally, it is required to give potential energy equal to the energy for bringing up the location of the center-of-gravity height "L" to that of the lateral rollover limit height "$L_{max}$". In addition, if the vehicle 1 is inclined (rotated) in a lateral direction (the rolling direction) with a force, it is finally rolled over, losing the restoring force, when a certain limit angle in the rolling direction (the restoring force losing lateral rollover limit angle "$\theta_{max}$") is reached. The restoring force is the elastic energy that supports the vehicle 1 from the right and left sides. Therefore, the relationship between the positional energy that causes the vehicle 1 to be rolled over and the elastic energy can be expressed by the following equation.

$$mg(L_{max} - L) = \frac{1}{2}k\left(\frac{1}{2}b\ \sin\theta_{max} + \frac{1}{2}b\ \sin\theta_{max}\right)^2 \qquad [\text{Math 04}]$$
$$= \frac{1}{2}k\ b^2\ \sin^2\theta_{max}$$

In [Math 04], the symbol "m" denotes the weight of the vehicle body (including the cargo, and the like) that is oscillated, being supported by the cushioning elastic forces (the tires 3 and the suspensions 4), and the symbol "k" denotes the respective spring constants for the right and left elastic forces (the tires 3 and the suspensions 4).

Here, since k/m can be expressed as $k/m = 2\pi^2 v'^2$, [Math 04] can be deformed into the following equation.

$$L_{max} - L = \frac{kb^2}{2mg}\sin^2\theta_{max} \qquad [\text{Math 05}]$$

$$= \frac{\pi^2 v'^2 b^2}{g}\sin^2\theta_{max}$$

Further, using [Math 01] to deform [Math 05] will give the following equation.

$$\sin^2\theta_{max} = \frac{L_{max} - L}{L_{max}} \qquad [\text{Math 06}]$$

$$\theta_{max} = \sin^{-1}\sqrt{\frac{L_{max} - L}{L_{max}}}$$

[Math 06] indicates that the restoring force losing lateral rollover limit angle "$\theta_{max}$" can be calculated with the use of the lateral rollover limit height "$L_{max}$" and the center-of-gravity height "L". The lateral rollover limit height "$L_{max}$", the center-of-gravity height "L", and the restoring force losing lateral rollover limit angle "$\theta_{max}$" are theoretically invariable so long as the situation of the vehicle body is not changed. Therefore, detection by the first acceleration sensor 11 and the angular velocity sensor 12; calculation of the vertical oscillation frequency "v'" and the horizontal oscillation frequency "V'"; calculation of the lateral rollover limit height "$L_{max}$" and the center-of-gravity height "L"; and calculation of the restoring force losing lateral rollover limit angle "$\theta_{max}$" need not be performed in real time, and can be conducted at the start of traveling the vehicle 1 or at predetermined time intervals.

Next, on the basis of the result of detection by the second acceleration sensor 13 (the acceleration in the right-left direction), the arithmetic part 21 calculates an inclination angle of the vehicle 1 in the rolling direction (hereinafter to be referred to as the rolling inclination angle "θ") as a comparative index that is to be compared with the restoring force losing lateral rollover limit angle "$\theta_{max}$" as a limit index, and outputs it from the reporting part 24 as a piece of lateral rollover warning information together with the restoring force losing lateral rollover limit "$\theta_{max}$" that has been determined. Hereinafter, the method of calculating the rolling inclination angle "θ".

If an external force is applied to the vehicle 1 from a lateral direction, the vehicle 1 is caused to be inclined (turned in the rolling direction), the rolling moment and the restoring force by the right and left springs are faced against each other. Therefore, as shown in FIG. 4B, if the external force is formulated on the assumption that the force applied to the center of gravity, W, of the vehicle 1 in the tangential direction is "f", and the rolling inclination angle of the vehicle 1 is "θ", the following equation can be obtained.

$$Lf = -m\left(\frac{kb^2}{2m} - gL\right)\sin\theta \qquad [\text{Math 07}]$$

Here, in order to make the development of the later-mentioned equation smooth, if the component "f" of the external force in the tangential direction is expressed by using a value of "q" of the ratio of the external force to the gravity "g", an equation of $f = mq g \times \cos\theta$ is obtained, and from [Math 07], the external force "q" (the value of the ratio to the gravity) can be expressed by the following equation.

$$Lqg\cos\theta = -\left(\frac{kb^2}{2m} - gL\right)\sin\theta \qquad [\text{Math 08}]$$

$$q = -\frac{\frac{kb^2}{2m} - gL}{gL}\tan\theta$$

Here, if k/m is expressed as $k/m = 2\pi^2 v'^2$, and [Math 08] is deformed by using [Math 09], the following equation can be obtained.

$$q = -\left(\frac{L_{max}}{L} - 1\right)\tan\theta \qquad [\text{Math 09}]$$

$$\theta = \tan^{-1}\left(-\frac{q}{\frac{L_{max}}{L} - 1}\right)$$

[Math 09] indicates that, once the lateral rollover limit height "$L_{max}$" and the center-of-gravity height "L" have been determined, based on the 3-D center-of-gravity detection theory, thereafter, simply by measuring the lateral G (the lateral acceleration), the rolling inclination angle "θ" of the vehicle 1 as a mobile body during traveling can be determined in real time. The arithmetic part 21 uses the result of detection by the second acceleration sensor 13 that is performed in real time (the acceleration in the right-left direction), the lateral rollover limit height "$L_{max}$", and the center-of-gravity height "L" to operate [Math 09], thereby calculating the rolling inclination angle "θ" of the vehicle 1 in real time.

Figure 5B:
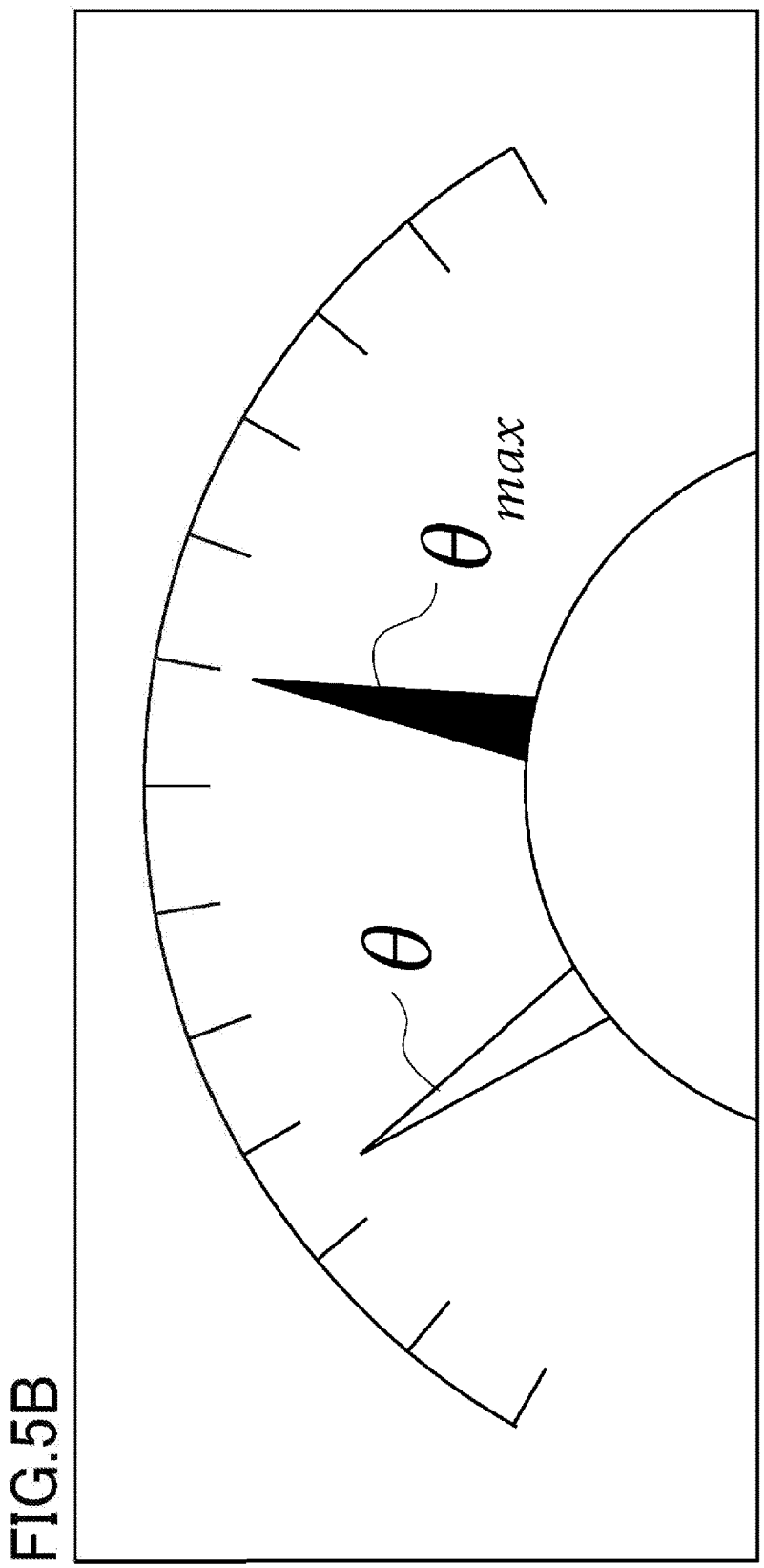
FIG. 5 is a drawing illustrating an example of output of a piece of lateral rollover risk warning information on a lateral rollover risk warning device according to the first embodiment of the present invention.

Next, the arithmetic part 21 causes the reporting part 24 to output the restoring force losing lateral rollover limit angle "$\theta_{max}$", which has been calculated as a limit index by using [Math 06], and the rolling inclination angle "θ" of the vehicle 1, which has been calculated as a comparative index using [Math 09], as a piece of lateral rollover risk warning information for notifying the driver thereof. FIG. 5A and FIG. 5B show examples of output as meter readings of the restoring force losing lateral rollover limit angle "$\theta_{max}$" and the rolling inclination angle "θ". The result of detection by the second acceleration sensor 13 (the acceleration in the right-left direction) is varied depending upon the steering angle and the vehicle speed, and the rolling inclination angle "θ" is continuously varied in correspondence to the result of detection by the second acceleration sensor 13 (the acceleration in the right-left direction). Then, once the arrow of the rolling inclination angle "θ" has reached that of the restoring force losing lateral rollover limit angle "$\theta_{max}$", an external force that exceeds the restoring force of the spring structures (the tires 3 and the suspensions 4) that support the vehicle 1 acts in the right-left direction, resulting in the vehicle 1 being rolled over in the right-left direction.

FIG. 5A shows the state at the time of traveling substantially straight, the arrow of the rolling inclination angle "θ" indicating approximately zero. On the other hand, FIG. 5B shows the state in which the vehicle 1 is subjected to a lateral G at the time of traveling on a curved path, the arrow of the rolling inclination angle "θ" approaching that of the restoring force losing lateral rollover limit angle "$\theta_{max}$". In either of the examples shown in FIG. 5A and FIG. 5B, the arrow of the rolling inclination angle "θ" is sufficiently away from that of the restoring force losing lateral rollover limit angle "$\theta_{max}$", whereby it can be confirmed in real time during traveling that there is no lateral rollover risk. Thereby, the driver can drive the vehicle 1, being careful not to allow the continuously varying rolling inclination angle "θ" to reach the restoring force losing lateral rollover limit angle "$\theta_{max}$", and thus can prevent the vehicle 1 from rolling over.

In [Math 09], if it is assumed that the rolling inclination angle "θ" is equal to the restoring force losing lateral rollover limit angle "$\theta_{max}$", and [Math 06] is substituted into [Math 09], the limit external force with which the restoring force by the right and left elastic forces (the tires 3 and the suspensions 4) is lost, the vehicle 1 being led to a lateral rollover in the right-left direction (hereinafter to be referred to as the restoring force losing lateral rollover limit external force "$q_{max}$") can be determined as a limit index by using the following equation.

$$q_{max} = -\left(\frac{L_{max}}{L} - 1\right)\tan\theta_{max}$$

$$= -\left(\frac{L_{max}}{L} - 1\right)\tan\left(\sin^{-1}\sqrt{\frac{L_{max} - L}{L_{max}}}\right)$$

[Math 10]

Therefore, the arithmetic part 21 may determine the "q", which is a value of the ratio of the external force to the gravity "g", as a comparative index from the result of detection by the second acceleration sensor 13 (the acceleration in the right-left direction), and cause the reporting part 24 to output the restoring force losing lateral rollover limit external force "$q_{max}$" as a limit index, which has been determined by means of [Math 10], and the external force "q" as a comparative index as a piece of lateral rollover risk warning information for notifying the driver thereof. Also in this case, the driver can identify the change in the external force "q" in real time, and can drive the vehicle 1, being careful not to allow the continuously varying external force "q" to reach the restoring force losing lateral rollover limit external force "$q_{max}$", and thus can prevent the vehicle 1 from rolling over.

The negative sign in [Math 09] and [Math 10] means that the direction of the restoring force by the springs always acts in a direction opposite to the direction of an external force. Therefore, in the case where the magnitude of the external force itself is required, the absolute value of the pertinent value in [Math 09] and [Math 10] can be used. Accordingly, in FIG. 5A and FIG. 5B, the angle is indicated as the absolute value on the basis of this concept.

In addition, in the first embodiment, there has been provided a configuration in which the limit index and the comparative index are outputted from the reporting part 24 as a piece of lateral rollover risk warning information, however, a result of comparison between the limit index and the comparative index may be outputted from the reporting part 24 as a piece of lateral rollover risk warning information, or a warning telling that the comparative index has too closely approached the limit index may be outputted from the reporting part 24 as a piece of lateral rollover risk warning information.

Second Embodiment

The first embodiment is based on a lateral rollover phenomenon that occurs when an external force "f" exceeding the restoring force of the spring structures (the tires 3 and the suspensions 4) supporting the vehicle 1 is exerted. In a lateral rollover risk warning device according to a second embodiment, a piece of lateral rollover risk warning information is generated based on another lateral rollover phenomenon. In other words, even if the restoring force by the spring structures (the tires 3 and the suspensions 4) is sufficient, the center of gravity, W, is rolled over with a straight line connecting between the location of the center of gravity, W, and the edge of the vehicle 1 on the rolling-over side (the point of contact with the road surface) being given as a rolling-over radius "r", as shown in FIG. 6. Such lateral rollover phenomenon is referred to as a lateral rollover on the geometrical structure. Here, an angle "φ" that is formed by a perpendicular drawn from the center of gravity, W, and the pertinent rolling-over radius "r" can be expressed by the following equation. The symbol "h" denotes the height from the road surface 30 to the vehicle axis 6.

$$\tan\varphi = \frac{\frac{b}{2} - L\sin\theta}{L\cos\theta + h}$$

[Math 11]

At this time, when the moment with which the external force acts to roll over the center of gravity, W, in the tangential direction of a locus of the center of gravity, W, exceeds the moment with which the gravity "mg" always holds down the center of gravity, W, in a direction opposite to the direction of lateral rollover, there occurs a lateral rollover on the geometrical structure. Therefore, the condition of a lateral rollover limit on the geometrical structure can be expressed by the following equation. Hereinafter, the external force of limit on the geometrical structure with which the vehicle 1 is led to a lateral rollover in the right-left direction is referred to as the lateral rollover limit external force on the geometrical structure, "$q_{\varphi max}$".

$$mqg \cos \varphi r \geq mg \sin \varphi r$$

[Math 12]

Accordingly, by finding the value of "q" that holds [Math 12], the lateral rollover limit external force on the geometrical structure, "$q_{\varphi max}$", for the vehicle 1 can be expressed by the following equation. The symbol "$\varphi_{min}$" denotes a minimum value of "φ" that provides the lateral rollover limit external force on the geometrical structure, "$q_{\varphi max}$."

$$q_{\varphi max} = \tan \varphi_{min}.$$

[Math 13]

As can be seen from FIG. 6, the values of "$\varphi_{min}$" and "$q_{\varphi max}$" are a function of "θ". In other words, the angle "φ" is at maximum when the center of gravity is at the center in the right-left direction, while it is at minimum when the vehicle 1 reaches the lateral rollover limit on the geometrical structure. Contrarily to this, the angle "θ" is at maximum when the vehicle 1 reaches the lateral rollover limit on the geometrical structure. Then, by substituting [Math 11] into [Math 13], and further [Math 09] thereinto, the lateral rollover limit external force on the geometrical structure, "$q_{\varphi max}$", for the vehicle 1 can be expressed by the following equation.

$$q_{\varphi max} = \frac{\frac{b}{2} - L\sin\left[\tan^{-1}\left(-\frac{q_{\varphi max}}{\frac{L_{max}}{L}-1}\right)\right]}{L\cos\left[\tan^{-1}\left(-\frac{q_{\varphi max}}{\frac{L_{max}}{L}-1}\right)\right]+h} \quad [\text{Math 14}]$$

The value of "q" that holds [Math 14] is the value of "$q_{\varphi max}$". It is difficult to analytically solve [Math 14], however, if a well-known technique for solving an equation by numerical value analysis is applied, the value of "$q_{\varphi max}$" can be obtained. In other words, with the arithmetic part 21, the lateral rollover limit height "$L_{max}$" and the center-of-gravity height "L" are substituted into [Math 14] to solve it for calculating a lateral rollover limit external force on the geometrical structure, "$q_{\varphi max}$", for the vehicle 1 as a limit index. In the second embodiment, the arithmetic part 21 determines the "q", which is a value of the ratio of the external force to the gravity "g", as a comparative index from the result of detection by the second acceleration sensor 13, and causes the reporting part 24 to output the lateral rollover limit external force on the geometrical structure, "$q_{\varphi max}$", as a limit index, and the "q" as a comparative index as a piece of lateral rollover risk warning information for notifying the driver thereof. Thereby, the driver can identify the change in the external force "q" in real time, and can drive the vehicle 1, being careful not to allow the continuously varying external force "q" to reach the lateral rollover limit external force on the geometrical structure, "$q_{\varphi max}$", for the vehicle 1, while determining the level of risk of rolling over on the geometrical structure in real time, and thus can prevent the vehicle 1 from rolling over.

In addition, in the second embodiment, there has been provided a configuration in which the limit index and the comparative index are outputted from the reporting part 24 as a piece of lateral rollover risk warning information, however, a result of comparison between the limit index and the comparative index may be outputted from the reporting part 24 as a piece of lateral rollover risk warning information, or a warning telling that the comparative index has too closely approached the limit index may be outputted from the reporting part 24 as a piece of lateral rollover risk warning information.

In order to verify the advantages of the first and second embodiments, a demonstration experiment was conducted using a large-sized sightseeing bus as the vehicle 1. By installing the external force detector 10 on a vehicle floor, and using a personal computer that functions as the data processing apparatus 20, the external force "q"; the restoring force losing lateral rollover limit external force "$q_{max}$", which has been mentioned in the first embodiment; and the lateral rollover limit external force on the geometrical structure, "$q_{\varphi max}$", which has been mentioned in the second embodiment, were generated as pieces of lateral rollover risk warning information to be displayed.

Figure 7A:
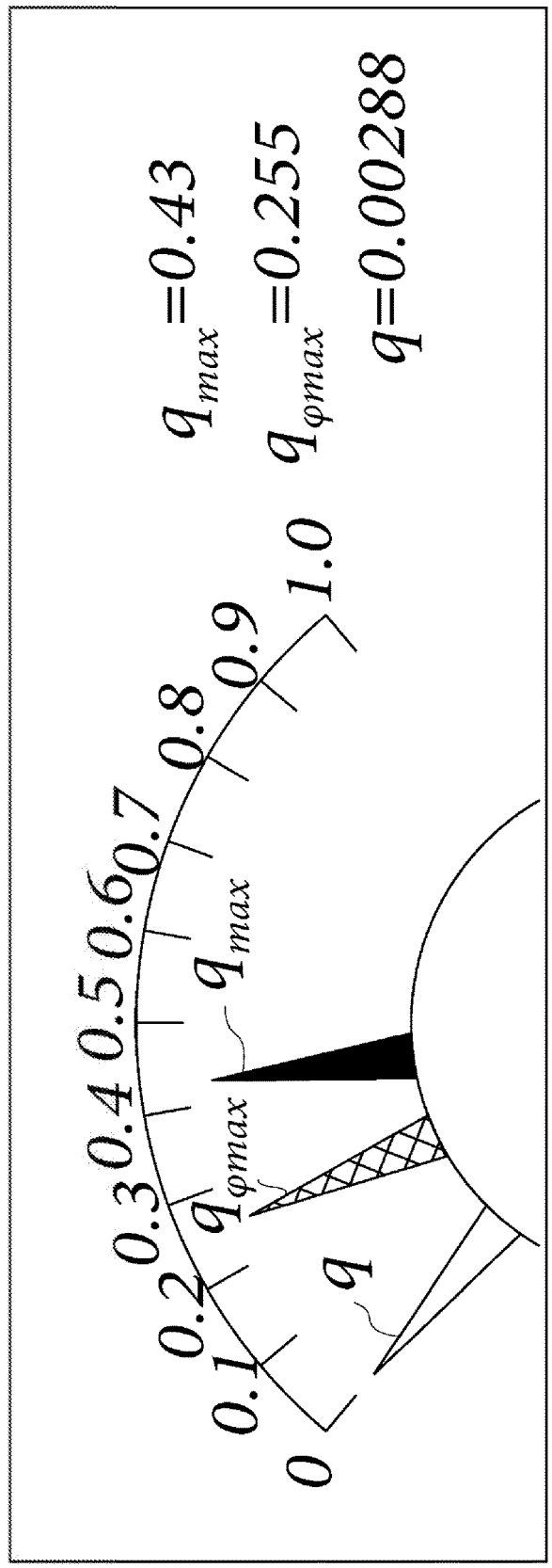
FIG. 7 is a drawing illustrating an example of output of a piece of lateral rollover risk warning information on a lateral rollover risk warning device according to a second embodiment of the present invention.

FIG. 7A gives an example of output of the external force "q", the restoring force losing lateral rollover limit external force "$q_{max}$", and the lateral rollover limit external force on the geometrical structure, "$q_{\varphi max}$", which were obtained as a result of completing the 3-D center-of-gravity detection (calculating the lateral rollover limit height "$L_{max}$" and the center-of-gravity height "L") at the time of straight-path traveling shortly after the start of the demonstration experiment, and using a personal computer, which functions as the data processing apparatus 20, to process them. FIG. 7B gives an example of output of the external force "q", the restoring force losing lateral rollover limit external force "$q_{max}$", and the lateral rollover limit external force on the geometrical structure, "$q_{\varphi max}$", which were obtained as a result of using a personal computer, which functions as the data processing apparatus 20, to process the external force measured in the middle of the vehicle 1 being subjected to a lateral G while traveling on a curved path, and the lateral rollover limit height "$L_{max}$" and the center-of-gravity height "L", which were obtained in advance by completing the 3-D center-of-gravity detection at the time of straight-line traveling.

In FIG. 7A, because the vehicle 1 was traveling on a straight path, the arrow that indicates the external force "q" points to approx. zero. In addition, the arrow indicating the external force "q" is located sufficiently away from the arrow for the restoring force losing lateral rollover limit external force "$q_{max}$", and that for the lateral rollover limit external force on the geometrical structure, "$q_{\varphi max}$", whereby it can be identified in real time during traveling that the vehicle 1 is free from lateral rollover risk.

In FIG. 7B, because the vehicle 1 was being subjected to a lateral G, traveling on a curved path, the arrow that indicates the external force "q" is distinctly deflected towards right, telling a rise in the external force "q". Also in this case, the arrow indicating the external force "q" is yet located sufficiently away from the arrow for the restoring force losing lateral rollover limit external force "$q_{max}$", and that for the lateral rollover limit external force on the geometrical structure, "$q_{\varphi max}$", whereby it can be identified in real time during traveling that the vehicle 1 is free from lateral rollover risk. In this way, since the driver of the vehicle 1 can acquire a piece of lateral rollover risk warning information of the present invention in real time, he or she can make an appropriate safe drive even in, for example, transportation of a cargo that is unknown about the loading condition.

If FIG. 7A and FIG. 7B are compared with each other, it can be known that the arrow of the restoring force losing lateral rollover limit external force "$q_{max}$" is substantially unchanged in its position. This is attributable to the fact that the restoring force losing lateral rollover limit external force "$q_{max}$" is a lateral rollover limit that is based on the restoring energy as can be seen from [Math 10]. If, with the vehicle 1, the vehicle body has no abnormality, and the loading weight is unchanged, the restoring force is constant during traveling. Therefore, calculation of the restoring force losing lateral rollover limit external force "$q_{max}$" need not be performed in real time, and can be conducted at the start of traveling the vehicle 1 or at predetermined time intervals.

Figure 8:
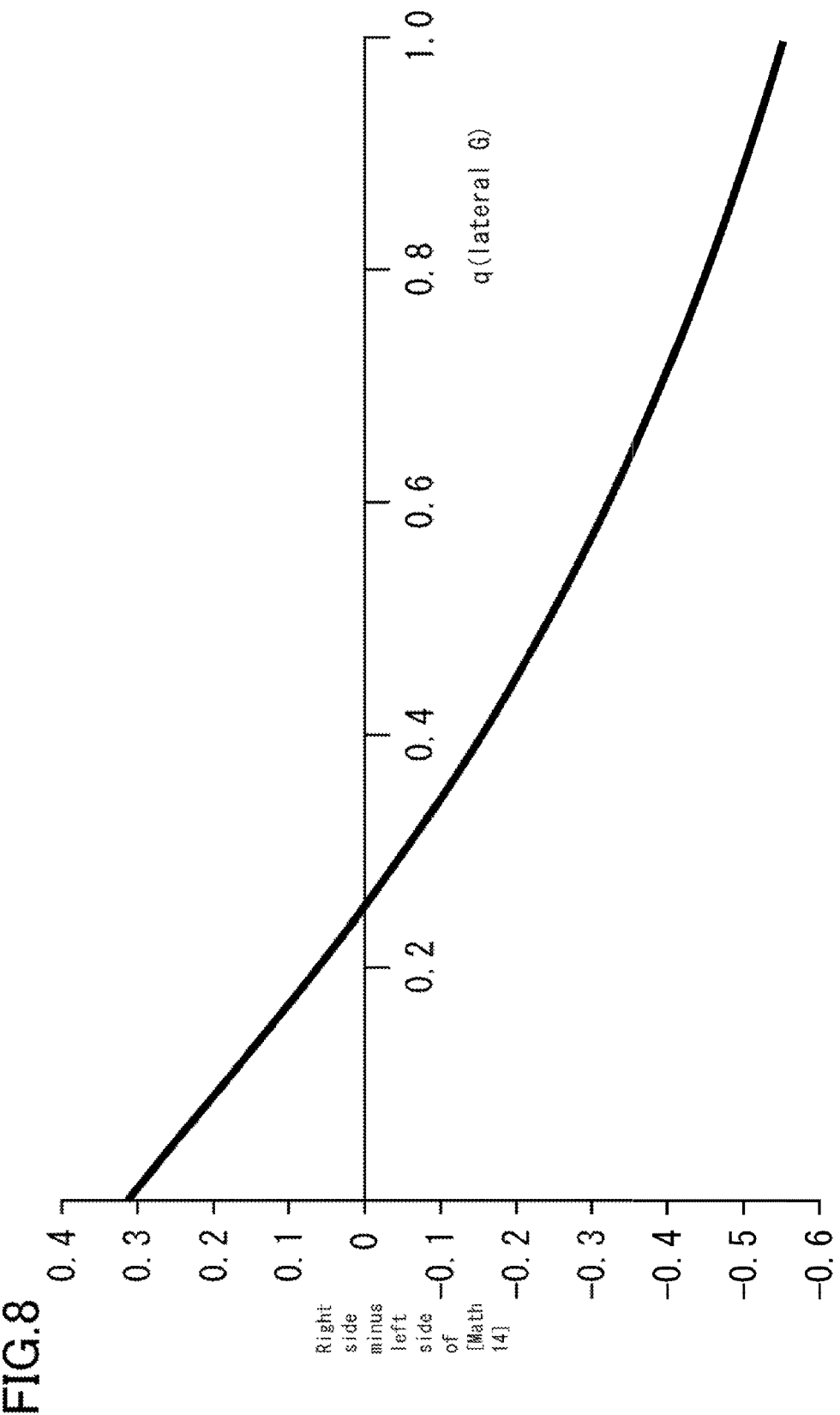
FIG. 8 is a graph for explaining a method of calculating a lateral rollover limit external force on the geometrical structure with a lateral rollover risk warning device according to the second embodiment of the present invention.

The graph given in FIG. 8 is a graph that has been prepared on the basis of the results of the demonstration experiment, indicating that [Math 14] has a solution. In FIG. 8, the abscissa represents the value of "q", while the ordinate gives the result of substituting the value of "q" into both sides of [Math 14], and then subtracting the left side from the right side of [Math 14]. The value on the abscissa at a location where the curve in FIG. 8 intersects with the abscissa (the value on the ordinate is equal to 0), i.e., approximately 0.255 is the value of the lateral rollover limit external force on the geometrical structure, "$q_{\varphi max}$".

As described above, the first and second embodiments provide a lateral rollover risk warning device that is installed in a vehicle 1 that is supported by spring structures (tires 3 and suspensions 4) on both sides in the right-left direction across a vehicle axis 6 of a vehicle body, respectively, reporting the risk of the vehicle 1 being rolled over, the lateral rollover risk warning device including a first acceleration sensor 11, which is a vertical direction physical amount detection means for detecting an external force applied in the vertical direction of the vehicle body; an angular velocity sensor 12, which is a rotational direction physical amount detection means for detecting a rotation around the vehicle axis 6 of the vehicle body; a limit index calculating means (an arithmetic part 21) that uses the results of detection by the first acceleration sensor 11 and the angular velocity sensor 12 to calculate an index of the limit at which the vehicle 1 is led to be rolled over; a second acceleration sensor 13, which is a right-left direction physical amount detection means for detecting an external force applied in the right-left direction of the vehicle body; a real-time index calculating means (the arithmetic part 21) that uses the result of detection by the second acceleration sensor 13 to calculate a comparative index to be compared with the limit index in real time; and a reporting part 24 that uses the limit index and the comparative index to report a piece of lateral rollover risk warning information telling the risk of rolling over.

With this configuration, the risk of the vehicle 1 rolling over laterally can be reported in real time during traveling on the basis of the results of detection by the first acceleration sensor 11, the angular velocity sensor 12, and the second acceleration sensor 13 installed on the vehicle body with no need for inputting the radius of a curved path in advance, and thus the vehicle 1 can be prevented from rolling over.

In addition, in the first embodiment, the limit index calculating means (the arithmetic part 21) is configured to calculate a restoring force losing lateral rollover limit external force "$q_{max}$", which indicates the angle of the vehicle body 1, "$\theta$", at a time when an external force exceeding the restoring force of the spring structures (the tires 3 and the suspensions 4) acts in the right-left direction, and thus the vehicle 1 is led to a rollover in the right-left direction, as a limit index.

With this configuration, the driver can drive the vehicle 1, being careful not to allow the continuously varying rolling inclination angle "$\theta$" to reach the restoring force losing lateral rollover limit angle "$\theta_{max}$", and thus can prevent the vehicle 1 from rolling over.

In addition, in the first embodiment, the limit index calculating means (the arithmetic part 21) is configured to calculate a restoring force losing lateral rollover limit angle "$q_{max}$", which indicates the external force "q" that exceeds the restoring force of the spring structures (the tires 3 and the suspensions 4), being applied in the right-left direction of the vehicle body, as a limit index.

With this configuration, the driver can drive the vehicle 1, being careful not to allow the continuously varying external force "q" to reach the restoring force losing lateral rollover limit external force "$q_{max}$", and thus can prevent the vehicle 1 from rolling over.

In addition, in the second embodiment, the limit index calculating means (the arithmetic part 21) is configured to calculate a lateral rollover limit external force on the geometrical structure, "$q_{\varphi max}$", which indicates the external force that leads the vehicle 1 to a rollover on the geometrical structure, being applied in the right-left direction, even if the restoring force by the spring structures (the tires 3 and the suspensions 4) is sufficient, as a limit index.

With this configuration, the driver can drive the vehicle 1, being careful not to allow the continuously varying rolling inclination angle "$\theta$" to reach the lateral rollover limit external force on the geometrical structure, "$q_{\varphi max}$", while determining the level of the risk of rolling over on the geometrical structure in real time, and thus can prevent the vehicle 1 from rolling over. Further, if the lateral rollover limit external force on the geometrical structure, "$q_{\varphi max}$", can be determined from [Math 14], "$\varphi_{min}$" can be determined from [Math 13]. This can also be used as a lateral rollover limit index. If the external force "q" is obtained from the second acceleration sensor 13, the rolling inclination angle "$\theta$" is obtained from [Math 09], and then if it is substituted into [Math 11], the angle "$\varphi$" that is formed by a perpendicular drawn from the center of gravity, W, and the pertinent rolling-over radius "r" can be derived. By observing the "$\varphi$" with respect to the "$\varphi_{min}$" in real time, the driver can identify the lateral rollover limit and the lateral rollover risk that depend upon the loading condition of the load.

Third Embodiment

Figure 9:
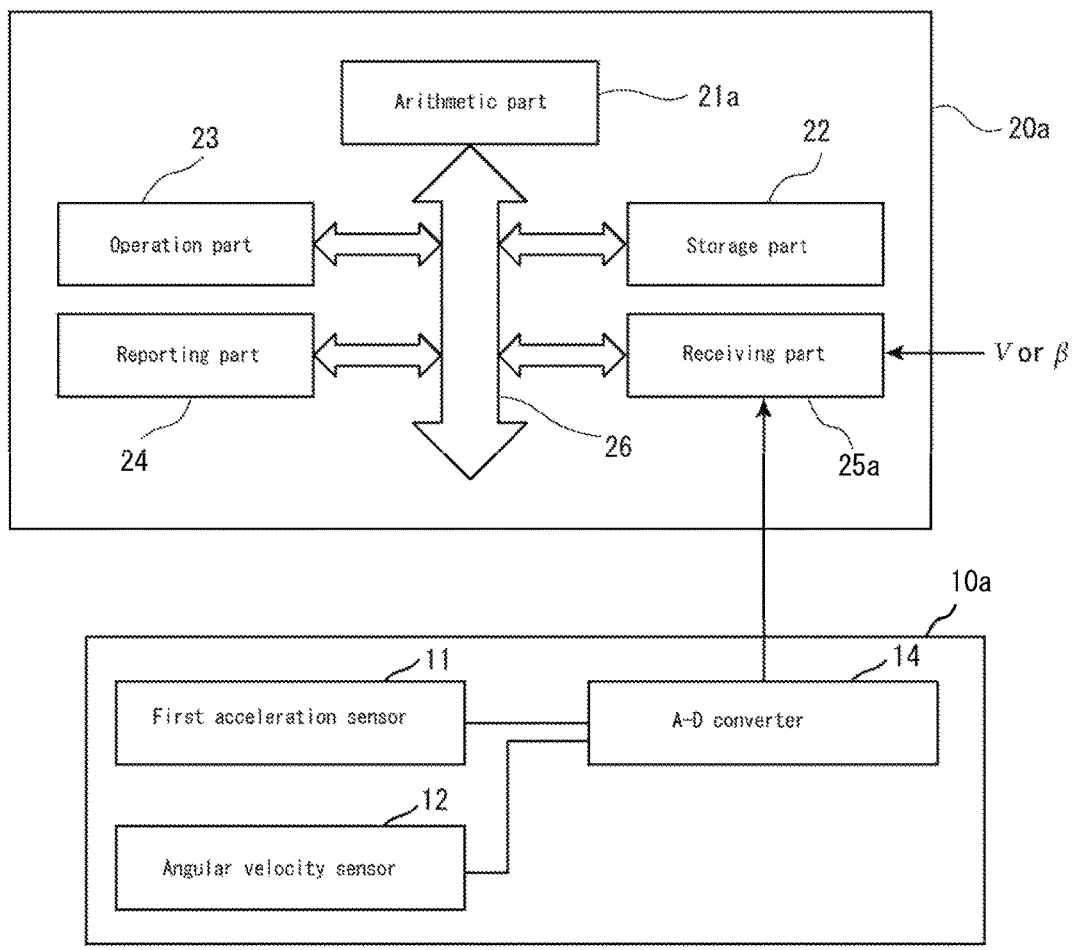
FIG. 9 is a block diagram illustrating a configuration of a lateral rollover risk warning device according to a third embodiment of the present invention.

In the first and second embodiments, the rolling inclination angle "$\theta$" for the vehicle 1 and the external force "q" are calculated in real time on the basis of the result of detection by the second acceleration sensor 13 (the acceleration in the right-left direction), thereby the driver being caused to recognize the lateral rollover risk. Contrarily to this, in the third embodiment, as shown in FIG. 9, the receiving part 25*a* of the data processing apparatus 20*a* receives either or both of the traveling speed "V" and the horizontal direction deflection angle "$\beta$" (the steering angle) from the vehicle 1 in real time as a piece of traveling information. Then, the arithmetic part 21*a* of the data processing apparatus 20*a* calculates a combination of the traveling speed "V" and the horizontal direction deflection angle "$\beta$" (the steering angle) with which the vehicle 1 is led to a rollover, as a limit condition, and, from the reporting part 24, outputs the pertinent limit condition and the piece of traveling information that has been received, as a piece of lateral rollover risk warning information.

Here, the method of calculating a limit condition will be explained.

As shown in FIG. 1, it is assumed that the vehicle 1 is making a turning-round motion at a definite angle in the horizontal direction during cornering at the time of traveling on a curved path. If the vehicle 1 is a train or automobile, the horizontal direction deflection angle "$\beta$" is equal to the steering angle (for an automobile, the angle at which the tires 3 are directed with respect to the direction of straight-line advance), so long as the vehicle 1 makes no side skip. Here, assuming that the centrifugal force acting on the vehicle 1 in the horizontal direction (the lateral direction) is "f$\beta$", the wheel space between the front and rear axles of the vehicle 1 is "H", and the radius of a traveling circle for the vehicle 1 is "R", then, from FIG. 4 and the formula of uniform circular motion, the relationship between the traveling speed "V" and the external force "q" can be expressed by the following equation.

$$f_\beta \cos\theta = f \qquad \text{[Math 15]}$$
$$m\frac{V^2}{R}\cos\theta = mqg\cos\theta$$
$$\frac{V^2}{R} = qg$$

Figure 10:
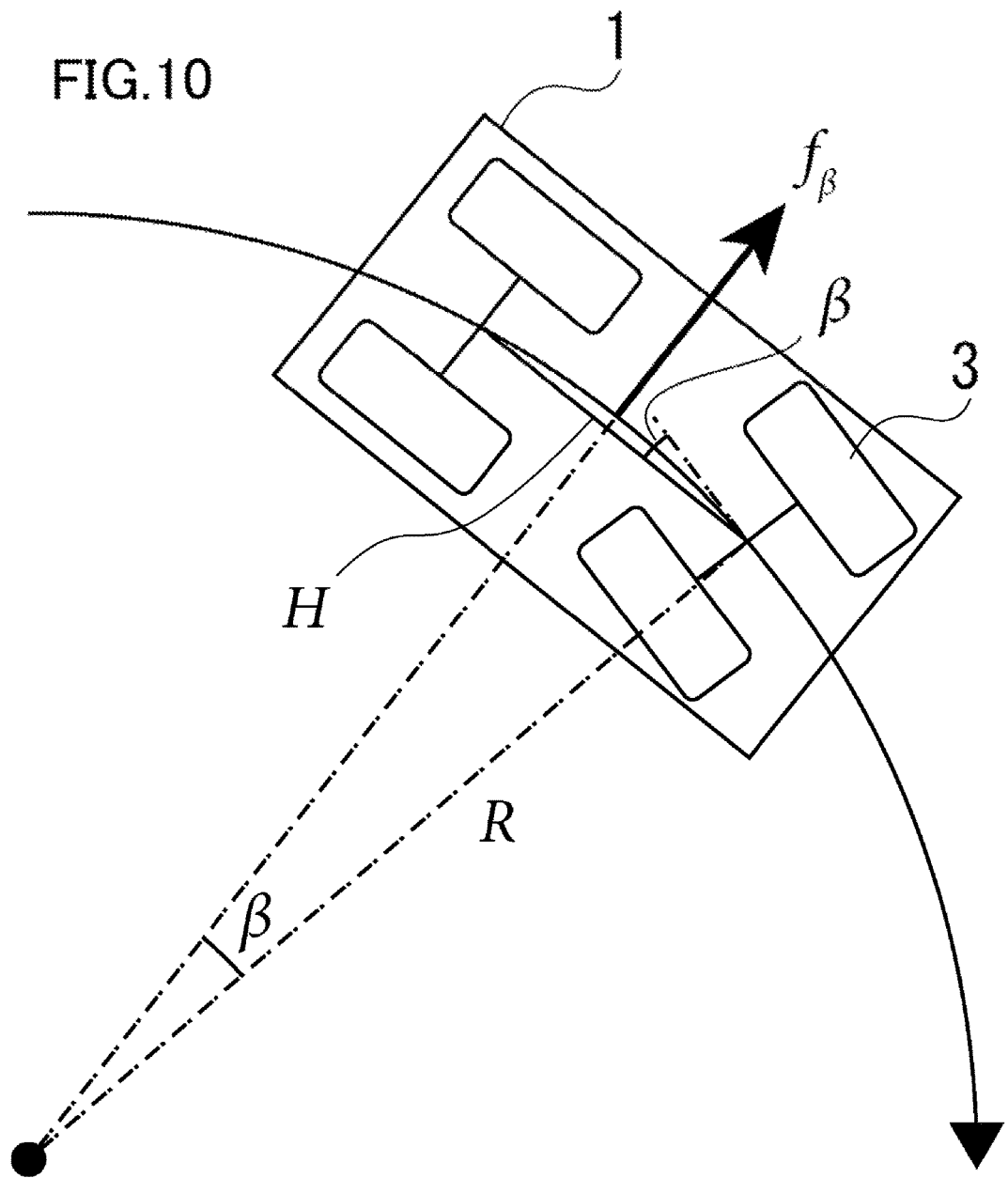
FIG. 10 is an explanatory drawing for explaining the turning-round motion of a vehicle at the time of traveling on a curved path.

Here, from FIG. 10, since R=H/2×sin β, the relationship among the horizontal direction deflection angle "β", the traveling speed "V", and the external force "q" can be expressed by the following equation.

$$\sin\beta = \frac{qgH}{2V^2}$$ [Math 16]

$$\beta = \sin^{-1}\frac{qgH}{2V^2}$$

Since the gravity acceleration "g" and the wheel space "H" are constants, by substituting the restoring force losing lateral rollover limit external force "$q_{max}$" into [Math 16], the relationship between the horizontal direction deflection angle "β" and the traveling speed "V" that lead the vehicle 1 to a rollover can be expressed by the following equation.

$$\beta = \sin^{-1}\left[\frac{gH}{2V^2}(q_{max})\right]$$ [Math 17]

In other words, [Math 17] is a relational expression of lateral rollover limit between the traveling speed "V" and the horizontal direction deflection angle "β", being a limit condition indicating a combination of the traveling speed "V" and the horizontal direction deflection angle "β" (the steering angle) with which the vehicle 1 is led to a lateral rollover. In [Math 17], if the traveling speed "V" is defined, the limit horizontal direction deflection angle, "$\beta_{max}$", at which the vehicle 1 is led to a rollover, is determined, and, if the horizontal direction deflection angle "β" is defined, the limit traveling speed "$V_{max}$", at which the vehicle 1 is led to a rollover, is determined.

Figure 11A:
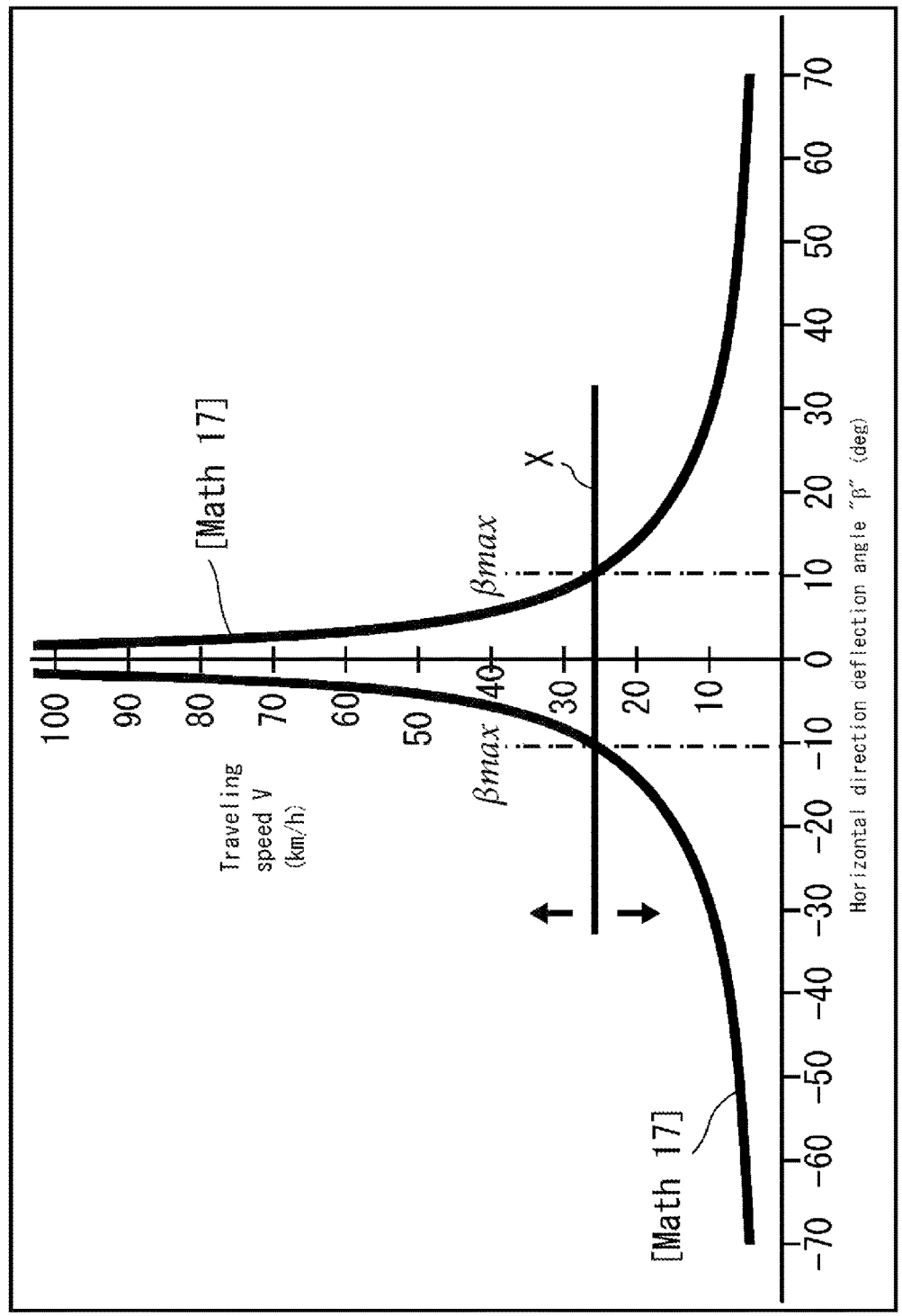
FIG. 11 is a drawing illustrating an example of output of a piece of lateral rollover risk warning information on a lateral rollover risk warning device according to the third embodiment of the present invention.
Figure 11B:
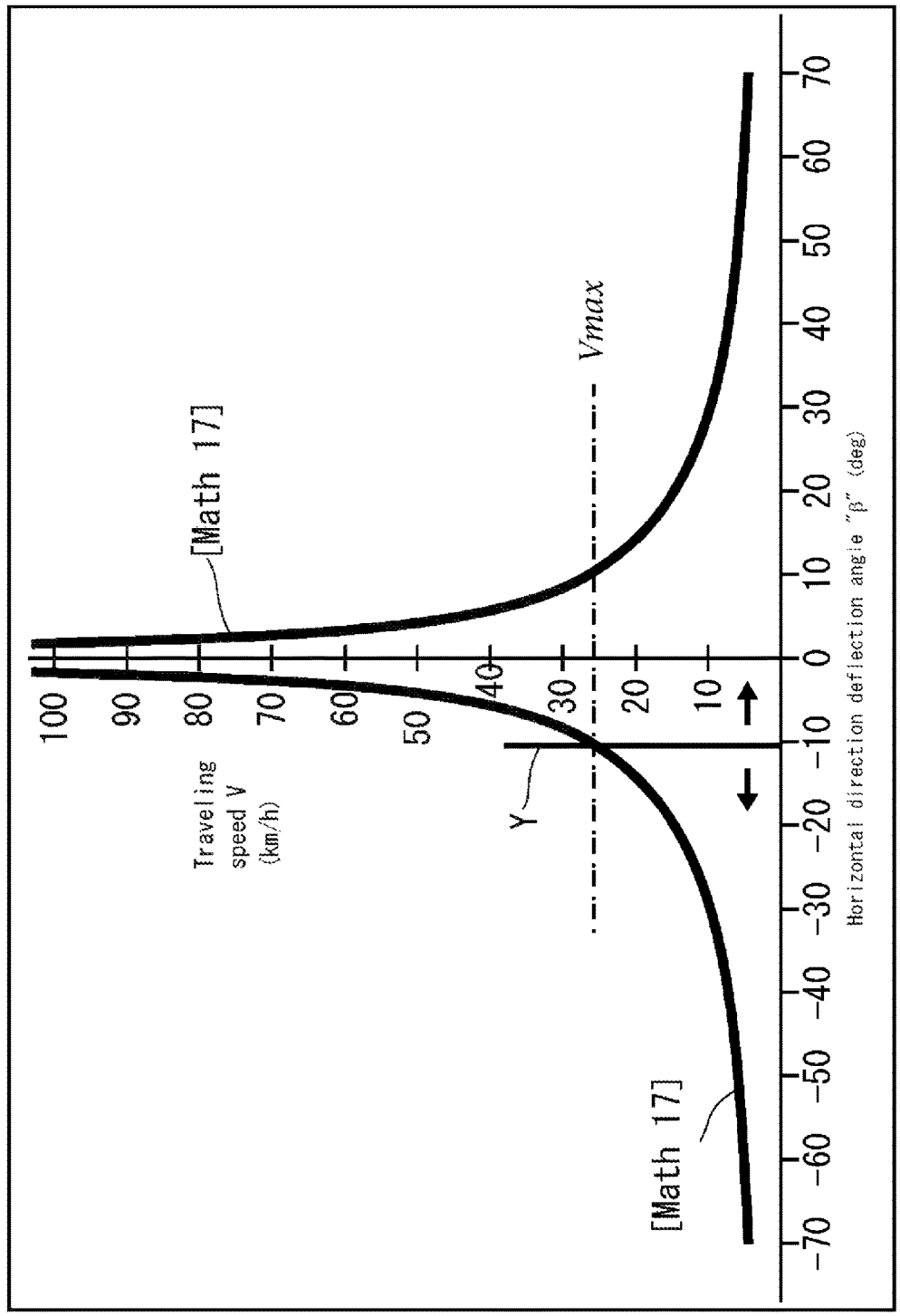
Figure 11C:
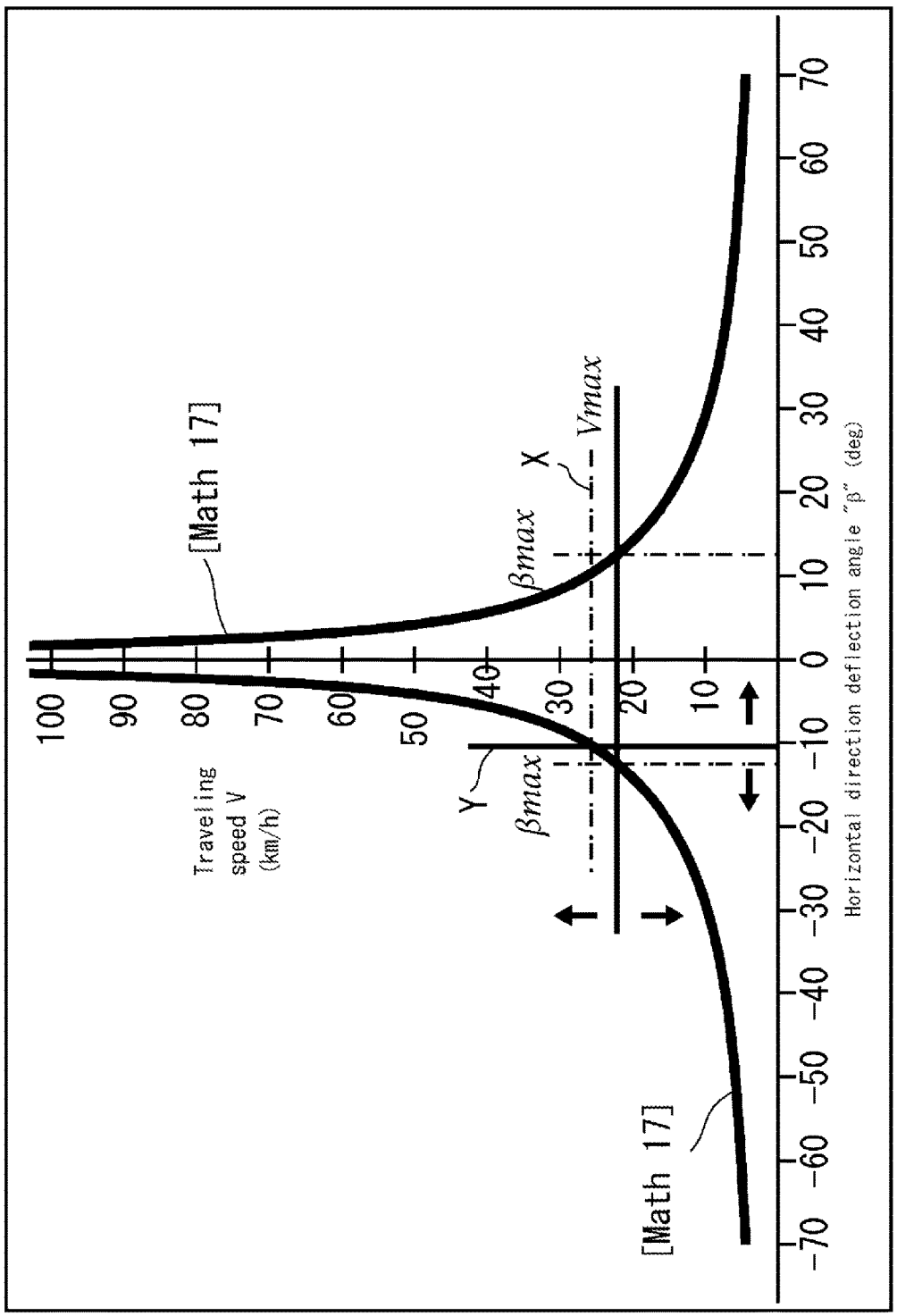

As shown in FIG. 11A, FIG. 11B, and FIG. 11C, the arithmetic part 21a generates a graph in which [Math 17], which is the limit condition, and the piece of traveling information that has been received from the vehicle 1 are plotted, as a piece of lateral rollover risk warning information, and outputs it from the reporting part 24. In FIG. 11A, FIG. 11B, and FIG. 11C, the abscissa represents the horizontal direction deflection angle "β", while the ordinate the traveling speed "V". As can be seen from FIG. 11A, FIG. 11B, and FIG. 11C, with [Math 17], as the traveling speed "V" is raised, the range of the horizontal direction deflection angle "β" (the range in which safe steering is possible) is rapidly narrowed down. Further, it can be seen that, when the traveling speed "V" is increased, a slight amount of steering can immediately lead to a lateral rollover of the vehicle 1. Such understanding agrees with a testimony of a driver who caused a lateral rollover accident.

FIG. 11A gives an example of output in the case where the traveling speed "V" has been received from the vehicle 1 as a piece of traveling information. A horizontal line X, which indicates the traveling speed "V" that has been received, is displayed on the graph, and by the intersection point between the horizontal line X and [Math 17], the driver is notified of the limit horizontal direction deflection angle, "$\beta_{max}$", at which the vehicle 1 is led to a rollover. FIG. 11B gives an example of output in the case where the horizontal direction deflection angle "β" has been received from the vehicle 1 as a piece of traveling information. A vertical line Y, which indicates the horizontal direction deflection angle "β" that has been received, is displayed on the graph, and by the intersection point between the vertical line Y and [Math 17], the driver is notified of the limit traveling speed "$V_{max}$", at which the vehicle 1 is led to a rollover.

Further, FIG. 11C gives an example of output in the case where the traveling speed "V" and the horizontal direction deflection angle "β" have been received from the vehicle 1 as a piece of traveling information. A horizontal line X, which indicates the traveling speed "V" that has been received, and a vertical line Y, which indicates the horizontal direction deflection angle "β" that has been received, are displayed on the graph, and by the intersection point between the horizontal line X and [Math 17], the driver is notified of the limit horizontal direction deflection angle, "$\beta_{max}$", at which the vehicle 1 is led to a rollover, while, by the intersection point between the vertical line Y and [Math 17], the driver is notified of the limit traveling speed "$V_{max}$", at which the vehicle 1 is led to a rollover. Therefore, the driver can compare the current traveling speed "V" with the limit traveling speed "$V_{max}$", and further can compare the current horizontal direction deflection angle "β" with the limit horizontal direction deflection angle, "$\beta_{max}$", whereby the driver can reliably determine the lateral rollover risk. For example, from the graph shown in FIG. 11C, the driver can grasp that, if the acceleration pedal is stepped down to raise the traveling speed "V", or the steering wheel is turned more to increase the horizontal direction deflection angle "β", the vehicle 1 can be led to a lateral rollover, whereby the driver can prevent the vehicle 1 from being rolled over.

In the third embodiment, there has been provided a configuration in which, by substituting the restoring force losing lateral rollover limit external force "$q_{max}$" into [Math 16], the relational expression between the horizontal direction deflection angle "β" and the traveling speed "V" with which the vehicle 1 is led to a lateral rollover is determined, however, by substituting the restoring force losing lateral rollover limit external force on the geometrical structure, "$q_{\varphi max}$", into [Math 16], the relational expression between the horizontal direction deflection angle "β" and the traveling speed "V" with which the vehicle 1 is led to a lateral rollover may be determined. In addition, the relational expression that is obtained by substituting the restoring force losing lateral rollover limit external force "$q_{max}$" into [Math 16], and the relational expression that is obtained by substituting the restoring force losing lateral rollover limit external force on the geometrical structure, "$q_{\varphi max}$", into [Math 16], may be both determined.

In addition, in the third embodiment, there has been provided a configuration in which the limit condition and the piece of traveling information are outputted from the reporting part 24 as a piece of lateral rollover risk warning information, however, a result of comparison between the limit condition and the piece of traveling information may be outputted from the reporting part 24 as a piece of lateral rollover risk warning information, or a warning telling that the piece of traveling information has too closely approached the limit condition may be outputted from the reporting part 24 as a piece of lateral rollover risk warning information.

As described above, the third embodiment provides a lateral rollover risk warning device that is installed in a vehicle 1 that is supported by spring structures (tires 3 and suspensions 4) on both sides in the right-left direction across a vehicle axis 6 of a vehicle body, respectively, reporting the risk of the vehicle 1 being rolled over, the lateral rollover risk warning device including a first acceleration sensor 11, which is a vertical direction physical amount detection means for detecting an external force applied in the vertical direction of the vehicle body; an angular velocity sensor 12, which is a rotational direction physical amount detection means for detecting a rotation around the vehicle axis 6 of the vehicle body; a limit condition calculating means (an arithmetic part 21) that uses the results of detection by the first acceleration sensor 11 and the angular velocity sensor 12 to calculate a combination of the traveling speed "V" and the horizontal direction deflection angle "β" (the steering angle) with which the vehicle 1 is led to a rollover, as a limit condition; a traveling information receiving means (the receiving part 25) that receives either or both of the traveling speed "V" and the horizontal direction deflection angle "β" (the steering angle) from the vehicle 1 in real time as a piece of traveling information; and a reporting part 24 that uses the limit condition and the piece of traveling information to report a piece of lateral rollover risk warning information telling the risk of rolling over.

With this configuration, the driver can drive the vehicle 1, being careful not to allow the continuously varying piece of traveling information to reach the limit condition, while determining the level of the risk of rolling over in real time, and thus can prevent the vehicle 1 from rolling over.

Fourth Embodiment

The lateral rollover risk warning device in the first to third embodiments is configured to generate a piece of lateral rollover risk warning information telling the risk of rolling over of the vehicle 1 that is supported by the spring structures (the tires 3 and the suspensions 4) on both sides in the right-left direction across the vehicle axis 6 of the vehicle body, respectively, however, the lateral rollover risk warning device of the present invention is not limited to this. In other words, the structure that is a target of the present invention may be a matter having a structure that is subjected to a restoring force in the right-left direction.

The lateral rollover risk warning device in the fourth embodiment includes an external force detector 10 and a data processing apparatus 20 that are the same as those in the first embodiment, being installed on a floating body structure, such as a vessel, and generates a piece of lateral rollover risk warning information telling the risk of a capsize (a lateral rollover) of the floating body structure, such as a vessel.

Figure 12:
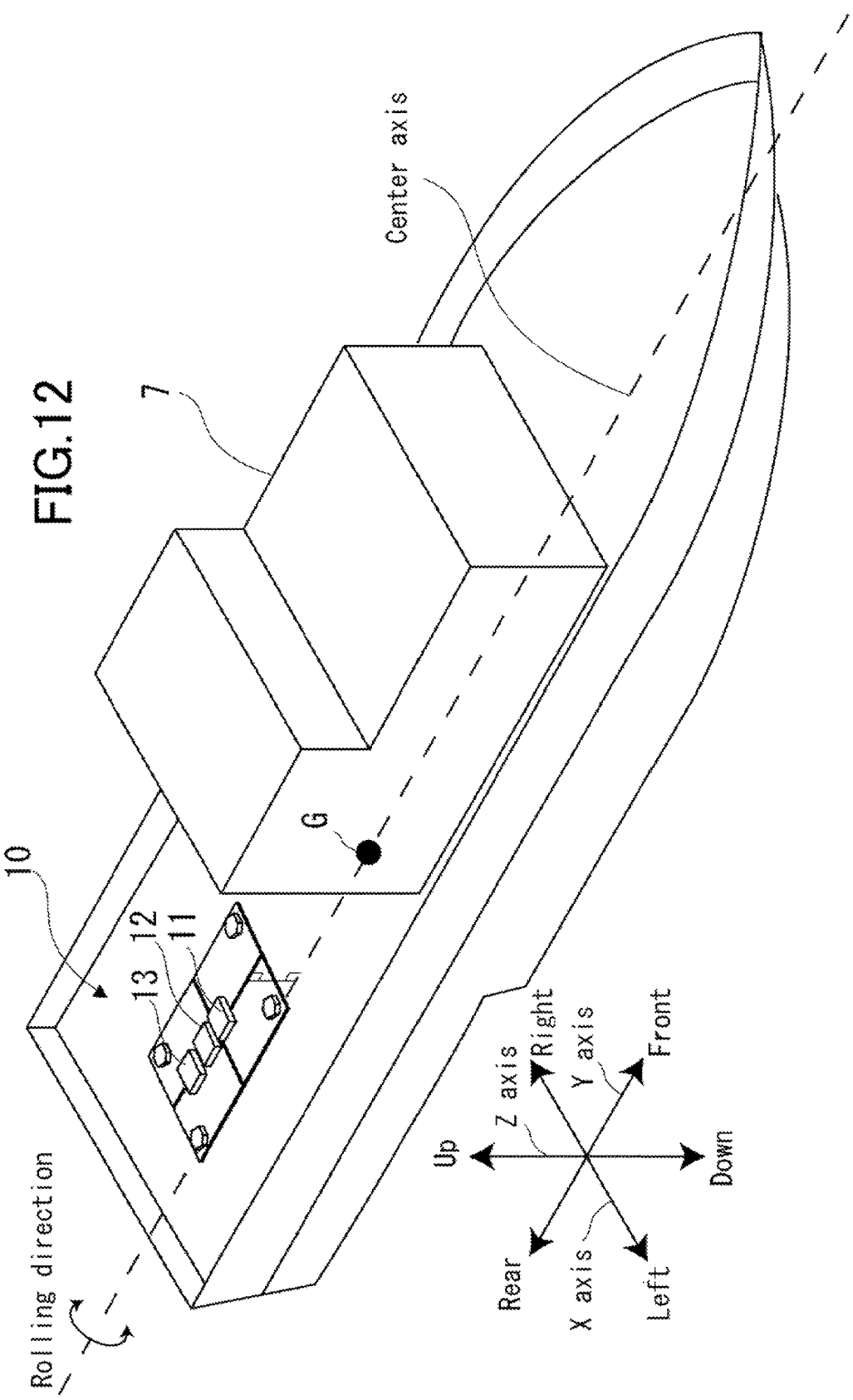
FIG. 12 is a drawing illustrating an example of loading of an external force detector in a lateral rollover risk warning device according to a fourth embodiment of the present invention on a vessel.

With reference to FIG. 12, mounting of an external force detector 10 to a vessel 7 is performed with the centerline of the vessel 7 being used as a datum. The centerline of the vessel 7 is an imaginary axis in the front-back direction on which the gravity G of the vessel 7 is located. With a first acceleration sensor 11, the sensitivity axis is adjusted such that a vertical oscillation in an up-down direction of the vessel 7 is detected, and the first acceleration sensor 11 functions as an up-down direction physical amount detecting means for detecting a reciprocating motion in the up-down direction of the vessel 7. In addition, with an angular velocity sensor 12, the sensitivity axis is adjusted such that a horizontal oscillation in the rolling direction around the center axis of the vessel 7 is detected, and the angular velocity sensor 12 functions as a rotational direction physical amount detecting means for detecting a simple pendulum motion in the rolling direction around the center axis of the vessel 7. With a second acceleration sensor 13, the sensitivity axis is adjusted such that an acceleration in the right-left direction (the X-axis direction shown in FIG. 12), i.e., an external force in the right-left direction that is orthogonal to the center axis of the vessel 7, and the second acceleration sensor 13 functions as a right-left direction physical amount detecting means for detecting an external force that is applied to the vessel 7 in the right-left direction thereof. The external force detector 10 may be installed in a location that is away from the centerline to a certain degree, being displaced forward or backward, or rightward or leftward, within a range in which there occurs no problem of a wrong detection for motions affected by another axis.

According to the capsize risk level calculation system that has been proposed in PCT/JP2013/063647, the relationship among the metacenter M, the center of gravity G, the buoyancy center B, the oscillation center axis O, and the separation GZ in the event that the vessel 7, which is a floating structure, is led to a great inclination is as shown in FIG. 13. In FIG. 13, the vessel 7 represented by (a) is in the state in which it is at an angle of horizontal oscillation inclination of 0°; the vessel 7 represented by (b) is in the state in which it is inclined at an angle of horizontal oscillation inclination of θ; and the vessel 7 represented by (c) is in the state in which it is further inclined at an angle of horizontal oscillation inclination of $\theta_{max}$.

With reference to FIG. 13, a floating structure, such as the vessel 7, that floats on the water surface has a maximum restoring force when it is located at the center of oscillation in the right-left direction, and as the floating structure is displaced in the lateral direction, the restoring force is gradually lost, resulting in all the restoring force being lost when the angle of horizontal oscillation inclination of $\theta_{max}$ being reached. In other words, the energy that horizontally moves the hull from the center of the oscillation in the right-left direction until it is at an angle of horizontal oscillation inclination of $\theta_{max}$ is equal to the potential energy that is required to bring up the center of gravity of the vessel 7 from a level corresponding to the oscillation radius "L" to that corresponding to the capsize limit oscillation radius "$L_{max}$". Here, it is assumed that "x" is the horizontal distance over which the vessel 7 has been moved from the center of oscillation in the right-left direction. In the event that the vessel 7 is subjected to a lateral wind or a lateral wave, or steered into a turning-round motion, a lateral acceleration (a lateral G) is applied to the vessel 7. If this is represented by "q" (a ratio to the gravity) as given in FIG. 12, the moving energy for the hull in the horizontal direction is expressed by "mqgx". In addition, the rotational motion energy for changing the position of the vessel 7 for the oscillation radius L through the angle "θ" is represented by the following expression, which can be obtained by integrating, by angle, the restoring moment towards the horizontal direction that is received from, for example, the floating force. Here, the symbol "V'" denotes the natural frequency (the rolling frequency) of oscillation in the right-left direction of the center of gravity.

$$\frac{1}{6\pi V'} mgL\theta\tan\theta \qquad \text{[Math 18]}$$

Since this rotational motion energy is equal to the moving energy in the horizontal direction, the following expression can be obtained.

$$mqgx = \frac{1}{6\pi V'} mgL\theta\tan\theta \qquad \text{[Math 19]}$$

Here, since, from FIG. 13, tan θ=x/L, the following equation can be obtained from [Math 19], and if a value of "q", which is an external force in the right-left direction, is obtained by means of the second acceleration sensor 13, a value of "θ" can also be obtained.

$$mqgL\tan\theta = \frac{1}{6\pi V'}mgL\theta\tan\theta \quad \text{[Math 20]}$$

$$\theta = 6\pi V'q$$

Here, when "θ"="$\theta_{max}$", "q"="$q_{max}$" (the external force in the right-left direction with which the vessel 7 is led to a capsize), and thus the following equation can be obtained from [Math 20].

$$\theta_{max} = 6\pi V'q_{max} \quad \text{[Math 21]}$$

Further, from FIG. 13, "$\tan\theta_{max}$"=b/2L, and thus the following equation can be obtained.

$$6\pi V'q_{max} = \tan\theta^{-1}\frac{b}{2L} \quad \text{[Math 22]}$$

$$q_{max} = \frac{1}{6\pi V'}\tan\theta^{-1}\frac{b}{2L}$$

Accordingly, by determining the "$q_{max}$" from [Math 22], and, from the second acceleration sensor 13, obtaining the "q", which is the external force in the right-left direction, to always compare both with each other, the risk of capsize at the time of the vessel 7 being exposed to a lateral wind or a lateral wave, or the vessel 7 being steered into a turning-round motion can be estimated in real time. In addition, by determining the "$\theta_{max}$" from [Math 21], and obtaining the "θ" from [Math 20] in real time to compare both with each other, the same estimation as mentioned above may be performed.

Also in PCT/JP2013/063647, the capsize risk is discussed, however, the method allows calculation of a hull inclination angle that is estimated from a wave height when the wavelength becomes equal to "2b". Contrarily to this, the present invention as given in the fourth embodiment allows real-time determination of the risk of capsize at the time of exposure to a lateral wind, the risk of capsize at the time of turning-round by steering, and the risk of capsize of exposure to a lateral wave with a wavelength or wave height when the wavelength is not equal to "2b".

In addition, in the case where the present invention is implemented on a frozen path in a northern district, the piece of lateral rollover warning information can be used as a piece of information notifying the driver of a risk of slip. In other words, at the time of traveling on a curved path, the gripping force of the tires causes a lateral rollover, and, on a frozen path, there would occur a slip at the moment when the lateral rollover conditions in the present invention has been met. Therefore, the driver can identify the change in the external force "q" in real time, and can drive the vehicle, being careful not to allow the continuously varying external force "q" to too closely approach the restoring force losing lateral rollover limit external force "$q_{max}$", and thus can prevent the vehicle from slipping.

It is obvious that the present invention is not limited to the above-mentioned embodiments, and within the technical scope of the present invention, the above-mentioned embodiments may be altered as appropriate. In addition, the number, location, geometry, and the like, of the above-mentioned component members are not limited to those as given in the above-mentioned embodiments, and may be altered into a number, location, geometry, and the like, that are suited for implementing the present invention. In each figure, the same component is provided with the same reference sign.

DESCRIPTION OF SYMBOLS

The symbol 1 denotes a vehicle; 2 a cargo bed; 3 tires; 4 suspensions; 5 a driver's seat; 6 a vehicle axis; 7 a vessel; 10 an external force detector; 11 a first acceleration sensor; 12 an angular velocity sensor; 13 a second acceleration sensor; 14 an A/D converter; 20, 20a a data processing apparatus; 21, 21a an arithmetic part; 22 a storage part; 23 an operation part; 24 a reporting part; 25, 25a a receiving part; 26 a bus; and 30 a road surface.

What is claimed is:

1. A lateral rollover risk warning device that is installed in a vehicle that is supported by spring structures of respective sides in the right-left direction across a vehicle axis of a vehicle body, reporting a risk of said vehicle being rolled over, said lateral rollover risk warning device comprising:
   a vertical direction physical amount detection means for detecting an external force applied in the vertical direction of said vehicle body,
   a rotational direction physical amount detection means for detecting a rotation around said vehicle axis of said vehicle body,
   a limit index calculating means that uses the results of detection by said vertical direction physical amount detection means and said rotational direction physical amount detection means to calculate a limit index,
   wherein the limit index is an index of a limit at which said vehicle is led to be rolled over,
   a right-left direction physical amount detection means for detecting an external force applied in the right-left direction of said vehicle body,
   a real-time index calculating means that uses the result of detection by said right-left direction physical amount detection means to calculate a comparative index to be compared with said limit index in real time; and
   a reporting means that uses said limit index and said comparative index to report a piece of lateral rollover risk warning information telling the risk of rolling over.

2. The lateral rollover risk warning device according to claim 1, wherein said limit index calculating means calculates a restoring force losing lateral rollover limit external force, which indicates an external force that exceeds the restoring force of said spring structures, being applied to said vehicle, as said limit index.

3. The lateral rollover risk warning device according to claim 1, wherein said limit index calculating means calculates a restoring force losing lateral rollover limit angle, which indicates the angle of said vehicle body at a time when an external force exceeding the restoring force of said spring structures acts in the right-left direction, and thus said vehicle is led to a rollover in the right-left direction, as said limit index.

4. The lateral rollover risk warning device according to claim 1, wherein said limit index calculating means calculates a lateral rollover limit external force on the geometrical structure, which indicates the external force that leads said vehicle to a rollover on the geometrical structure, being applied in the right-left direction, even if the restoring force by said spring structures is sufficient, as said limit index.

5. A lateral rollover risk warning device that is installed in a vessel that is supported by a floating force of respective sides in the right-left direction across the centerline, reporting a risk of said vessel being rolled over, said lateral rollover risk warning device comprising:
- a vertical direction physical amount detection means for detecting an external force applied in the vertical direction of said vessel,
- a rotational direction physical amount detection means for detecting a rotation around said centerline of said vessel,
- a limit index calculating means that uses the results of detection by said vertical direction physical amount detection means and said rotational direction physical amount detection means to calculate a limit index, wherein the limit index is an index of a limit at which said vessel is led to be rolled over,
- a right-left direction physical amount detection means for detecting an external force applied in the right-left direction of said vessel,
- a real-time index calculating means that uses the result of detection by said right-left direction physical amount detection means to calculate a comparative index to be compared with said limit index in real time, and
- a reporting means that uses said limit index and said comparative index to report a piece of lateral rollover risk warning information telling the risk of rolling over.

* * * * *